(12) United States Patent
Tsai et al.

(10) Patent No.: US 9,146,381 B2
(45) Date of Patent: *Sep. 29, 2015

(54) OPTICAL IMAGE CAPTURING LENS ASSEMBLY

(71) Applicant: LARGAN PRECISION CO., LTD., Taichung (TW)

(72) Inventors: Tsung-Han Tsai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,843

(22) Filed: Nov. 3, 2014

(65) Prior Publication Data

US 2015/0049394 A1 Feb. 19, 2015

Related U.S. Application Data

(63) Continuation of application No. 13/938,249, filed on Jul. 10, 2013, now Pat. No. 8,908,295.

(30) Foreign Application Priority Data

Jul. 1, 2013 (TW) .............................. 102123487 U

(51) Int. Cl.
*G02B 13/18* (2006.01)
*G02B 9/08* (2006.01)
*G02B 9/62* (2006.01)
*G02B 13/00* (2006.01)
*H04N 5/225* (2006.01)
*G02B 9/60* (2006.01)
*G02B 5/00* (2006.01)

(52) U.S. Cl.
CPC .............. *G02B 13/0045* (2013.01); *G02B 9/60* (2013.01); *H04N 5/2254* (2013.01); *G02B 5/005* (2013.01); *G02B 9/62* (2013.01); *G02B 13/002* (2013.01); *G02B 13/0015* (2013.01); *G02B 13/18* (2013.01)

(58) Field of Classification Search
CPC ........ G02B 13/045; G02B 9/62; G02B 13/18; G02B 13/0015; G02B 13/002; G02B 5/005
USPC .................................. 359/713, 739, 740, 757
See application file for complete search history.

(56) References Cited

U.S. PATENT DOCUMENTS 8,908,295 B1 * 12/2014 Tsai et al. ..................... 359/757

* cited by examiner

*Primary Examiner* — Evelyn A Lester
(74) *Attorney, Agent, or Firm* — CKC & Partners Co., Ltd.

(57) ABSTRACT

An optical image capturing lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region. The second lens element with negative refractive power has an object-side surface being concave in a paraxial region and an image-side surface being convex in a paraxial region. The third lens element has refractive power. The fourth lens element with refractive power has an object-side surface being convex in a paraxial region. The fifth lens element with positive refractive power has an image-side surface being convex in a paraxial region. The sixth lens element with refractive power has an image-side surface being concave in a paraxial region.

38 Claims, 13 Drawing Sheets

OPTICAL IMAGE CAPTURING LENS ASSEMBLY

RELATED APPLICATIONS

The present application is a continuation of the application Ser. No. 13/938,249, filed Jul. 10, 2013, the entire contents of which are hereby incorporated herein by reference, which claims priority to Taiwan Application Serial Number 102123487, filed Jul. 1, 2013, all of which are herein incorporated by reference.

BACKGROUND

1. Technical Field

The present disclosure relates to an optical image capturing lens assembly. More particularly, the present disclosure relates to a compact optical image capturing lens assembly applicable to electronic products.

2. Description of Related Art

In recent years, with the popularity of mobile products having camera functional-ties, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the axial distance between the first lens element and the second lens element tends to cause problems in assembling since the axial distance between the first lens element and the second lens element is rather small. Accordingly, it is not favorable for being applied to compact electronic products. Moreover, the unfavorable arrangement of the refractive power of the second lens element also leads to greater sensitivity which thereby causes worse image quality.

SUMMARY

According to one aspect of the present disclosure, an optical image capturing lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element with negative refractive power has an object-side surface being concave in a paraxial region thereof and an image-side surface being convex in a paraxial region thereof. The third lens element has refractive power. The fourth lens element with refractive power has an object-side surface being convex in a paraxial region thereof. The fifth lens element with positive refractive power has an image-side surface being convex in a paraxial region thereof. The sixth lens element with refractive power has an image-side surface being concave in a paraxial region, wherein the image-side surface of the sixth lens element has at least one convex shape in an off-axis region thereof, and an object-side surface and the image-side surface of the sixth lens element are aspheric. The optical image capturing lens assembly has a total of six lens elements with refractive power. When a focal length of the optical image capturing lens assembly is f, a curvature radius of the object-side surface of the second lens element is R3, a curvature radius of the image-side surface of the second lens element is R4, and a curvature radius of the object-side surface of the fourth lens element is R7, the following relationships are satisfied:

$0.60 < f/R7$; and $(R3+R4)/(R3-R4) \leq -1.09$.

According to another aspect of the present disclosure, an image capturing device includes the optical image capturing lens assembly according to the aspect and an image sensor. The image sensor is located on an image plane side of the optical image capturing lens assembly.

According to further another aspect of the present disclosure, an optical image capturing lens assembly comprising, in order from an object side to an image side, a first lens element, a second lens element, a third lens element, a fourth lens element, a fifth lens element, and a sixth lens element. The first lens element with positive refractive power has an object-side surface being convex in a paraxial region thereof and an image-side surface being concave in a paraxial region thereof. The second lens element with negative refractive power has an object-side surface being concave in a paraxial region thereof and an image-side surface being convex in a paraxial region thereof. The third lens element has refractive power. The fourth lens element with refractive power has an object-side surface being convex in a paraxial region thereof. The fifth lens element with positive refractive power has an image-side surface being convex in a paraxial region thereof. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are aspheric. The optical image capturing lens assembly has a total of six lens elements with refractive power. When a focal length of the optical image capturing lens assembly is f, a curvature radius of the object-side surface of the second lens element is R3, a curvature radius of the image-side surface of the second lens element is R4, and a curvature radius of the object-side surface of the fourth lens element is R7, the following relationships are satisfied:

$0.60 < f/R7$; and $(R3+R4)/(R3-R4) < -1.0$.

According to yet another aspect of the present disclosure, an image capturing device includes the optical image capturing lens assembly according to the aspect and an image sensor. The image sensor is located on an image plane side of the optical image capturing lens assembly.

BRIEF DESCRIPTION OF THE DRAWINGS

The disclosure can be more fully understood by reading the following detailed description of the embodiments, with reference made to the accompanying drawings as follow.

DETAILED DESCRIPTION

Figure 1:
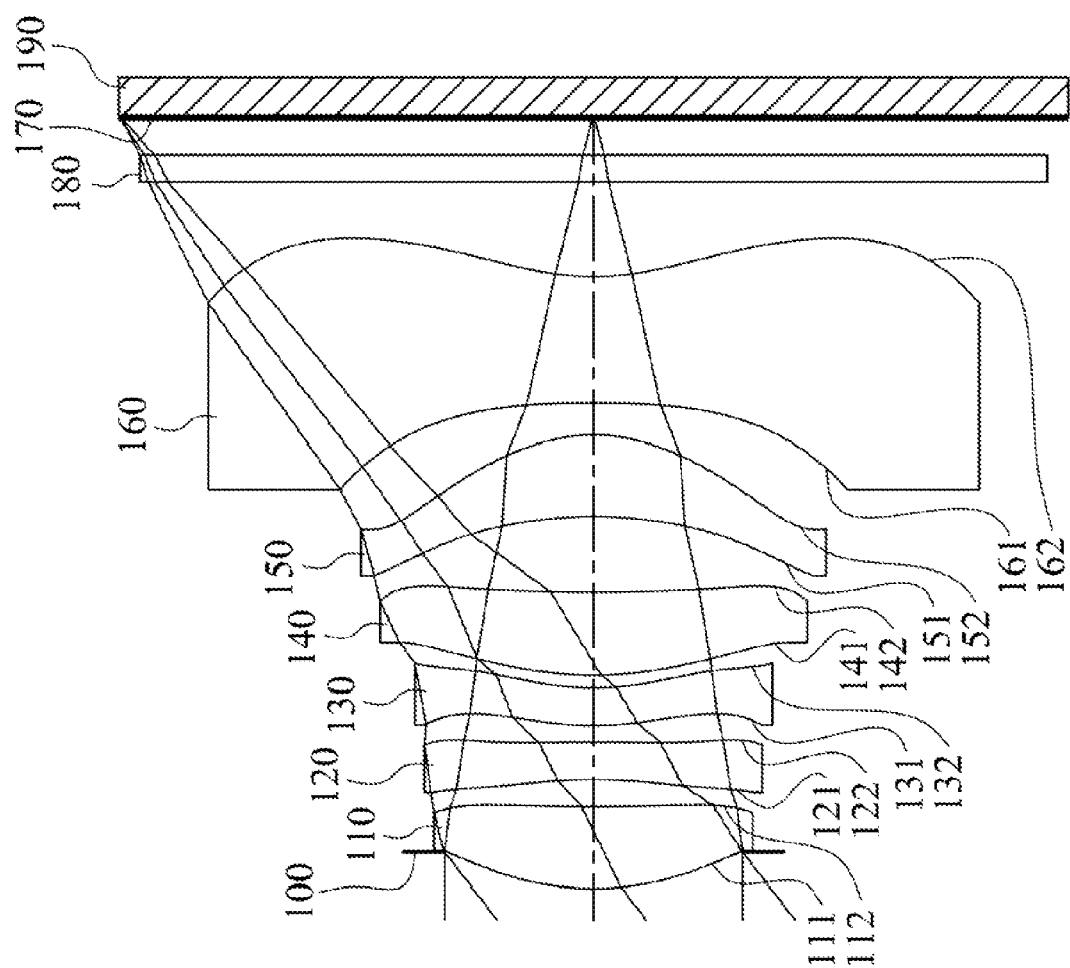
FIG. 1 is a schematic view of an optical image capturing lens assembly according to the 1st embodiment of the present disclosure.

An optical image capturing lens assembly includes, in order from an object side to an image side, a first lens element, a second lens element, a third lens element, a fourth lens element, a fifth lens element, and a sixth lens element. The optical image capturing lens assembly has a total of six lens elements with refractive power and can further include a stop and an image sensor, wherein the stop is located between an imaged object and the second lens element, and the image sensor is located on an image plane side of the optical image capturing lens assembly. More specifically, the image sensor can be located on an image plane.

The first lens element with positive refractive power has an object-side surface being convex in a paraxial region thereof, so that the total track length of the optical image capturing lens assembly can be reduced by properly adjusting the positive refractive power of the first lens element.

The second lens element with negative refractive power has an object-side surface being concave in a paraxial region thereof and an image-side surface being convex in a paraxial region thereof, so that the main refractive power of the optical image capturing lens assembly can be more balanced so as to effectively reduce the tolerance sensitivity.

The third lens element with refractive power can have an object-side surface being convex in a paraxial region thereof and an image-side surface being concave in a paraxial region thereof, wherein the image-side surface of the third lens element changes to a convex shape from the paraxial region thereof to an off-axis region thereof, or changes to a convex shape and then to a concave shape from the paraxial region thereof to the off-axis region thereof. Therefore the astigmatism and the aberration of the off-axis can be corrected.

The fourth lens element with refractive power has an object-side surface being convex in a paraxial region thereof and can have an image-side surface being concave in a paraxial region thereof. Therefore, the astigmatism can be further corrected.

The fifth lens element with positive refractive power can have an object-side surface being concave in a paraxial region thereof, and has an image-side surface being convex in a paraxial region thereof. Therefore, the sensitivity of the optical image capturing lens assembly can be reduced effectively.

The sixth lens element can have negative refractive power and has an image-side surface being concave in a paraxial region thereof, wherein the image-side surface of the sixth lens element has at least one convex shape in an off-axis region thereof. Therefore, the principal point of the optical image capturing lens assembly can be positioned away from the image plane, and the back focal length thereof can be reduced so as to maintain a compact size of the optical image capturing lens assembly. Furthermore, the incident angle of the off-axis on the image sensor can be effectively reduced for increasing the responding efficiency of the image sensor.

When a focal length of the optical image capturing lens assembly is f, and a curvature radius of the object-side surface of the fourth lens element is R7, the following relationship is satisfied: $0.60 < f/R7$. Therefore, the astigmatism and spherical aberration of the optical image capturing lens assembly can be effectively corrected. Preferably, the following relationship is satisfied: $0.6 < f/R7 < 2.0$.

When a curvature radius of the object-side surface of the second lens element is R3, and a curvature radius of the image-side surface of the second lens element is R4, the following relationship is satisfied: $(R3+R4)/(R3-R4) < -1.0$. Therefore, the interference caused by the smaller axial distances between lens elements during the assembling can be avoided, and the arrangement of the lens element is more applicable to compact optical systems with strict space limitations. Preferably, the following relationship is satisfied: $-5.0 < (R3+R4)/(R3-R4) < -1.0$.

When a focal length of the fifth lens element is f5, and a focal length of the sixth lens element is f6, the following relationship is satisfied: $-1.0 < f6/f5 < -0.5$. Therefore, the distribution of the refractive power of the optical image capturing lens assembly can be balanced for reducing the back focal length thereof so as to keep the compact size of the optical image capturing lens assembly.

When an axial distance between the third lens element and the fourth lens element is T34, and an axial distance between the fourth lens element and the fifth lens element is T45, the following relationship is satisfied: $0.05 < T34/T45 < 0.35$. Therefore, it is favorable for assembling the lens elements of the optical image capturing lens assembly so as to increase the manufacturing yield rate.

When a distance in parallel with an optical axis from an axial vertex on the image-side surface of the fifth lens element to a maximum effective diameter position on the image-side surface of the fifth lens element is Sag52, and a central thickness of the fifth lens element is CT5, the following relationship is satisfied: $1.0 < |Sag52|/CT5$. Therefore, the surface shape of the lens elements will not be excessively curved which is favorable for manufacturing and molding the lens elements and keeping the optical image capturing lens assembly more compact.

When a focal length of the third lens element is f3, and a focal length of the fourth lens element is f4, the following relationship is satisfied: $-0.6<f4/f3<0.3$. Therefore, it is favorable for reducing the photosensitivity and correcting the aberration.

When a central thickness of the fifth lens element is CT5, and a central thickness of the sixth lens element is CT6, the following relationship is satisfied: $0.5<CT5/CT6<1.2$. Therefore, it provides favorable moldability and homogeneity for plastic lens elements during the injection molding process.

When an Abbe number of the first lens element is V1, an Abbe number of the second lens element is V2, and an Abbe number of the third lens element is V3, the following relationship is satisfied: $0.6<(V2+V3)/V1<1.2$. Therefore, the chromatic aberration of the optical image capturing lens assembly can be corrected.

When a maximum image height of the optical image capturing lens assembly (half of a diagonal length of an effective photosensitive area of the image sensor) is ImgH, and an axial distance between the object-side surface of the first lens element and the image plane is TL, the following relationship is to satisfied: $TL/ImgH<2.0$. Therefore, it is favorable for keeping the optical image capturing lens assembly compact so as to be applied to thin and portable electronic products.

According to the optical image capturing lens assembly of the present disclosure, at least two lens elements among the first through the fourth lens elements have at least one inflection point formed on at least one of the object-side surface and the image-side surface thereof. Therefore, it is favorable for correcting the aberration of the off-axis.

According to the optical image capturing lens assembly of the present disclosure, the lens elements thereof can be made of glass or plastic material. When the lens elements are made of glass material, the distribution of the refractive power of the optical image capturing lens assembly may be more flexible to design. When the lens elements are made of plastic material, the manufacturing cost can be effectively reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Therefore, the total track length of the optical image capturing lens assembly can also be reduced.

According to the optical image capturing lens assembly of the present disclosure, art aperture stop can be configured as a front stop or a middle stop. A front stop disposed between an imaged object and the first lens element can provide a longer distance between an exit pupil of the optical image capturing lens assembly and an image plane and thereby improves the image-sensing to efficiency of an image sensor. A middle stop disposed between the first lens element and the image plane is favorable for enlarging the field of view of the optical image capturing lens assembly and thereby provides a wider field of view for the same.

According to the optical image capturing lens assembly of the present disclosure, the optical image capturing lens assembly can include at least one stop, such as an aperture stop, a glare stop or a field stop. Said glare stop or said field stop is for eliminating the stray light and thereby improving the image resolution thereof.

According to the optical image capturing lens assembly of the present disclosure, each of an object-side surface and an image-side surface has a paraxial region and an off-axis region. The paraxial region refers to the region of the surface where light rays travel close to an optical axis, and the off-axis region refers to the region of the surface where light rays travel away from the optical axis. Particularly, when the lens element has a convex surface, it indicates that the surface is convex in the paraxial region thereof; and when the lens element has a concave surface, it indicates that the surface is concave in the paraxial region thereof.

According to the optical image capturing lens assembly of the present disclosure, the optical image capturing lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the optical image capturing lens assembly according to the present disclosure, and an image sensor located on an image plane side of said optical image capturing lens assembly. Accordingly, the image capturing device can provide superior image quality.

According to the above description of the present disclosure, the following 1st-6th specific embodiments are provided for further explanation.

1st Embodiment

Figure 2:
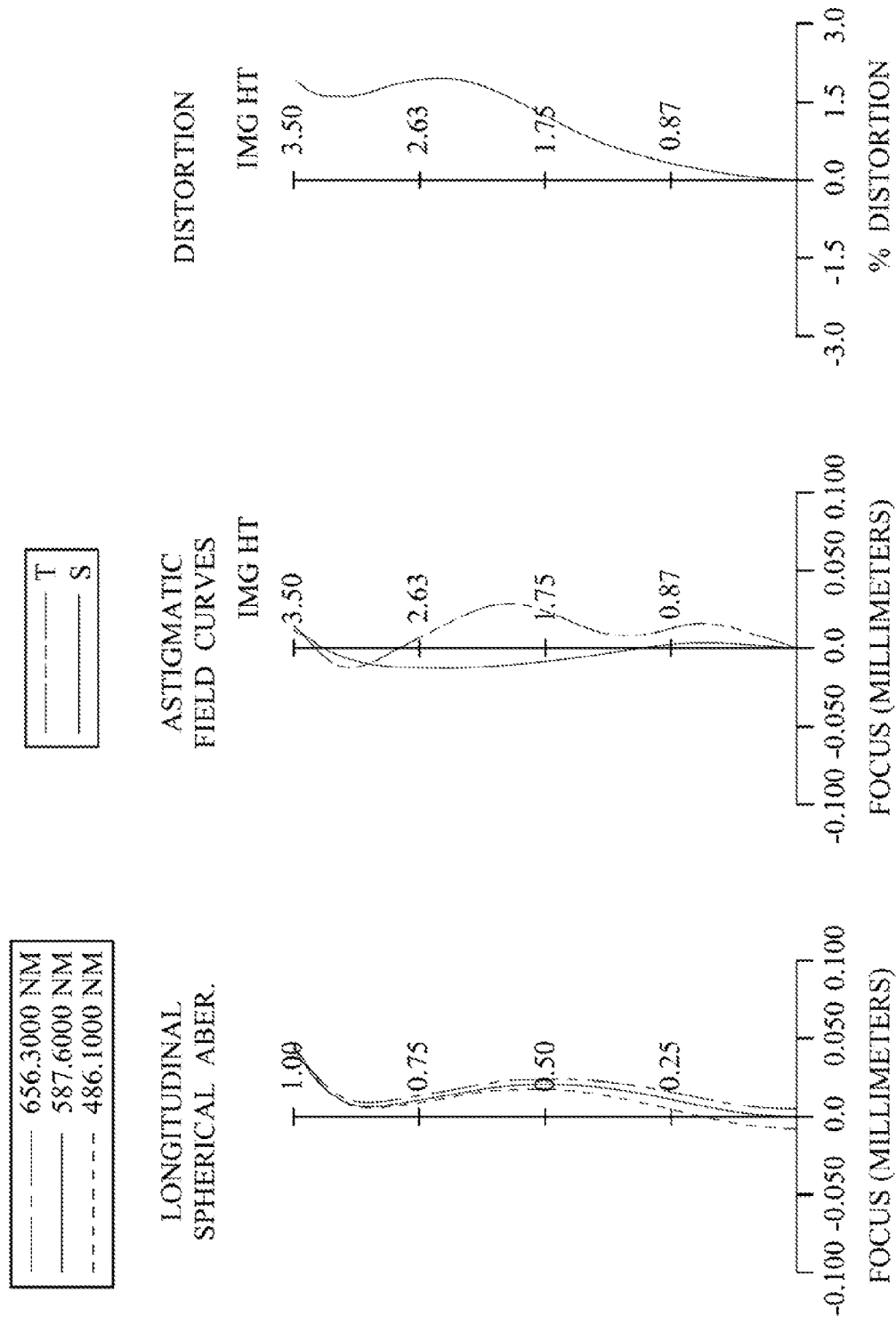
FIG. 2 shows spherical aberration curves, astigmatic field curves and a distortion curve of the optical image capturing lens assembly according to the 1st embodiment.

FIG. 1 is a schematic view of an optical image capturing lens assembly according to the 1st embodiment of the present disclosure. FIG. 2 shows spherical aberration curves, astigmatic field curves and a distortion curve of the optical image capturing lens assembly according to the 1st embodiment. In FIG. 1 the optical image capturing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170, and an image sensor 190, wherein the optical image capturing lens assembly has a total of six lens elements (110-160) with refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric, wherein both of the object-side surface 111 and the image-side surface 112 of the first lens element 110 have at least one inflection point.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric, wherein both of the object-side surface 121 and the image-side surface 122 of the second lens element 120 have at least one inflection point.

The third lens element 130 with negative refractive power has an object-side surface 131 being convex in a paraxial region thereof and an image-side surface 132 being concave in a paraxial region thereof, wherein the image-side surface 132 of the third lens element 130 changes to a convex shape and then to a concave shape from the paraxial region thereof to an off-axis region thereof. The third lens element 130 is made of plastic material and has the object-side surface 131 and the image-side surface 132 being both aspheric, wherein both of the object-side surface 131 and the image-side surface 132 of the third lens element 130 have at least one inflection point.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric, wherein both of the object-side surface 141 and the image-side surface 142 of the fourth lens element 140 have at least one inflection point.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof, wherein the image-side surface 162 of the sixth lens element 160 has a convex shape in an off-axis region thereof. The sixth lens element 160 is made of plastic material and has the object-side surface 161 and the image-side surface 162 being both aspheric.

The IR-cut filter 180 made of glass material is located between the sixth lens element 160 and the image plane 170, and will not affect a focal length of the optical image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image capturing lens assembly according to the 1st embodiment, when a focal length of the optical image capturing lens assembly is f, an f-number of the optical image capturing lens assembly is Fno, and half of a maximal field of view of the optical image capturing lens assembly is HFOV, these parameters have the following values: f=4.40 mm; Fno=2.00; and HFOV=37.9 degrees.

In the optical image capturing lens assembly according to the 1st embodiment, when an Abbe number of the first lens element 110 is V1, an Abbe number of the second lens element 120 is V2, and an Abbe number of the third lens element 130 is V3, the following relationship is satisfied: (V2+V3)/V1=0.83.

In the optical in capturing lens assembly according to the 1st embodiment, when an axial distance between the third lens element 130 and the fourth lens element 140 is T34, and an axial distance between the fourth lens element 140 and the fifth lens element 150 is I45, the following relationship is satisfied: T34/T45=0.17.

In the optical image capturing lens assembly according to the 1st embodiment, when a central thickness of the fifth lens element 150 is CT5, and a central thickness of the sixth lens element 160 is CT6, the following relationship is satisfied: CT5/CT6=0.64.

Figure 13:
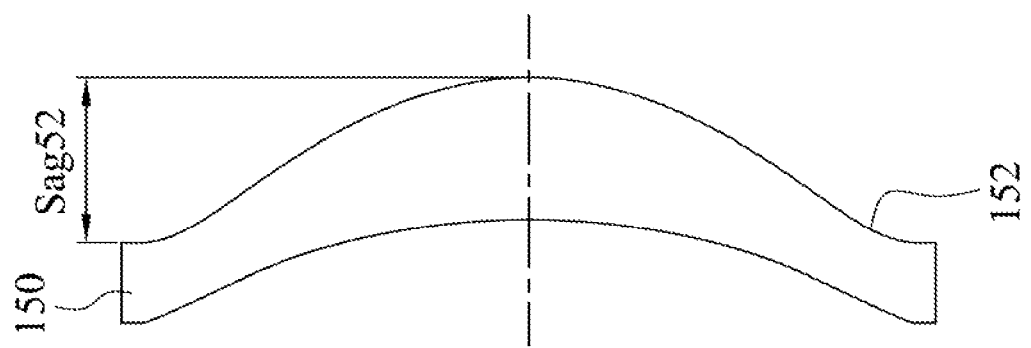
FIG. 13 shows Sag52 of the fifth lens element of the optical image capturing lens assembly as illustrated in FIG. 1.

FIG. 13 shows Sag52 of the image-side surface 152 of the fifth lens element 150 of the optical image capturing lens assembly as illustrated in FIG. 1. In FIG. 13, when a distance in parallel with an optical axis from an axial vertex on the image-side surface 152 of the fifth lens element 150 to a maximum effective diameter position on the image-side surface 152 of the fifth lens element 150 is Sag52, and the central thickness of the fifth lens element is CT5, the following relationship is satisfied: |Sag52|/CT5=1.16.

In the optical image capturing lens assembly according to the 1st embodiment, when a curvature radius of the object-side surface 121 of the second lens element 120 is R3, and a curvature radius of the image-side surface 122 of the second lens element 120 is R4, the following relationship is satisfied: (R3+R4)/(R3−R4)=−1.59.

In the optical image capturing lens assembly according to the 1st embodiment, when the focal length of the optical image capturing lens assembly is f, and a curvature radius of the object-side surface 141 of the fourth lens element 140 is R7, the following relationship is satisfied: f/R7=1.60.

In the optical image capturing lens assembly according to the 1st embodiment, when a focal length of the third lens element 130 is f3, and a focal length of the fourth lens element 140 is f4, the following relationship is satisfied: f4/f3=−0.19.

In the optical image capturing lens assembly according to the 1st embodiment, when a focal length of the fifth lens element 150 is f5, and a focal length of the sixth lens element 160 is f6, the following relationship is satisfied: f6/f5=−0.75.

In the optical image capturing lens assembly according to the 1st embodiment, when a maximum image height of the optical image capturing lens assembly (half of a diagonal length of an effective photosensitive area of the image sensor 190) is ImgH, and an axial distance between the object-side surface 111 of the first lens element 110 and the image plane 170 is TL, the following relationship is satisfied: TL/ImgH=1.63.

The detailed optical data of the 1st embodiment are shown in Table 1, and the aspheric surface data are shown in Table 2 below.

TABLE 1

1st Embodiment
f = 4.40 mm, Fno = 2.00, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.268 | | | | |
| 2 | Lens 1 | 2.078 | ASP | 0.609 | Plastic | 1.544 | 55.9 | 4.40 |
| 3 | | 14.095 | ASP | 0.200 | | | | |

TABLE 1-continued

1st Embodiment
f = 4.40 mm, Fno = 2.00, HFOV = 37.9 deg.

| Surface # | | Curvature Radius | | Thickness | Material | Index | Abbe # | Focal Length |
|---|---|---|---|---|---|---|---|---|
| 4 | Lens 2 | −3.361 | ASP | 0.275 | Plastic | 1.640 | 23.3 | −6.86 |
| 5 | | −14.778 | ASP | 0.123 | | | | |
| 6 | Lens 3 | 2.301 | ASP | 0.275 | Plastic | 1.640 | 23.3 | −33.94 |
| 7 | | 1.983 | ASP | 0.095 | | | | |
| 8 | Lens 4 | 2.752 | ASP | 0.616 | Plastic | 1.544 | 55.9 | 6.28 |
| 9 | | 13.004 | ASP | 0.559 | | | | |
| 10 | Lens 5 | −3.050 | ASP | 0.602 | Plastic | 1.544 | 55.9 | 3.44 |
| 11 | | −1.240 | ASP | 0.233 | | | | |
| 12 | Lens 6 | −9.590 | ASP | 0.934 | Plastic | 1.535 | 55.7 | −2.56 |
| 13 | | 1.653 | ASP | 0.700 | | | | |
| 14 | IR-cut filter | Plano | | 0.200 | Glass | 1.517 | 64.2 | — |
| 15 | | Plano | | 0.280 | | | | |
| 16 | Image | Plano | | — | | | | |

Note:
Reference wavelength is 587.6 nm (d-line).

TABLE 2

Aspheric Coefficients

| | Surface # | | | | | |
|---|---|---|---|---|---|---|
| | 2 | 3 | 4 | 5 | 6 | 7 |
| k = | −8.2715E+00 | −1.0000E+00 | −2.8882E+01 | −2.9666E+01 | 1.6438E+00 | −3.8035E−01 |
| A4 = | 9.7678E−02 | −3.1774E−02 | 3.8251E−02 | 8.3908E−02 | −1.6567E−01 | −1.2205E−01 |
| A6 = | −6.0842E−02 | 1.6161E−03 | −7.6693E−03 | −2.6504E−02 | 1.5119E−02 | −1.4299E−02 |
| A8 = | 2.8108E−02 | 1.0252E−02 | 4.1824E−02 | −1.5127E−02 | −3.7998E−02 | 1.3309E−02 |
| A10 = | −1.6688E−02 | 1.6666E−05 | −5.1134E−02 | 3.1282E−02 | 2.6061E−02 | −4.6602E−04 |
| A12 = | 9.1599E−03 | −3.0392E−02 | 2.5810E−03 | −3.5067E−02 | −1.0275E−02 | 1.4345E−03 |
| A14 = | −4.6911E−03 | 1.4177E−02 | 7.7054E−03 | 1.0282E−02 | 7.4298E−04 | |

| | Surface # | | | | | |
|---|---|---|---|---|---|---|
| | 8 | 9 | 10 | 11 | 12 | 13 |
| k = | −2.0433E+00 | −3.0000E+01 | 2.2402E+00 | −3.6841E+00 | −1.0000E+00 | −7.5280E+00 |
| A4 = | −2.0511E−02 | 1.1378E−03 | 2.7042E−02 | −6.6458E−02 | −3.9636E−02 | −3.5793E−02 |
| A6 = | −3.0954E−03 | −1.7037E−03 | 1.1152E−02 | 3.9729E−02 | −8.0149E−03 | 9.2783E−03 |
| A8 = | 3.5012E−04 | 4.4906E−04 | −3.3345E−02 | −2.7787E−02 | 7.0411E−03 | −1.9334E−03 |
| A10 = | 1.2580E−03 | −4.4334E−04 | 3.0891E−02 | 9.7745E−03 | −1.7457E−03 | 2.3472E−04 |
| A12 = | 1.0521E−03 | −3.2969E−04 | −1.0617E−02 | 1.8187E−04 | 1.1873E−04 | −1.6486E−05 |
| A14 = | −8.1166E−04 | −5.4817E−05 | 1.4326E−03 | −3.3818E−04 | 3.0573E−06 | 4.9346E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
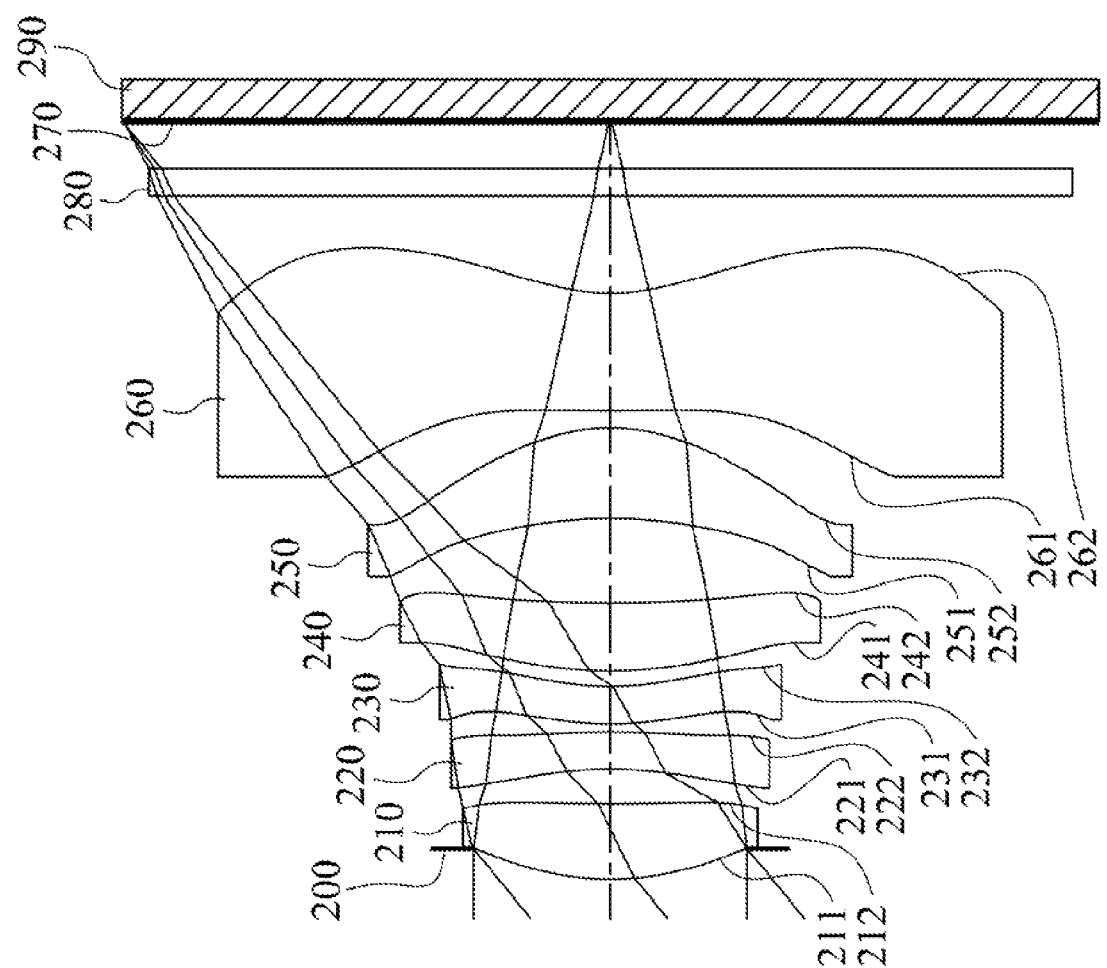
FIG. 3 is a schematic view of an optical image capturing lens assembly according to the 2nd embodiment of the present disclosure.
Figure 4:
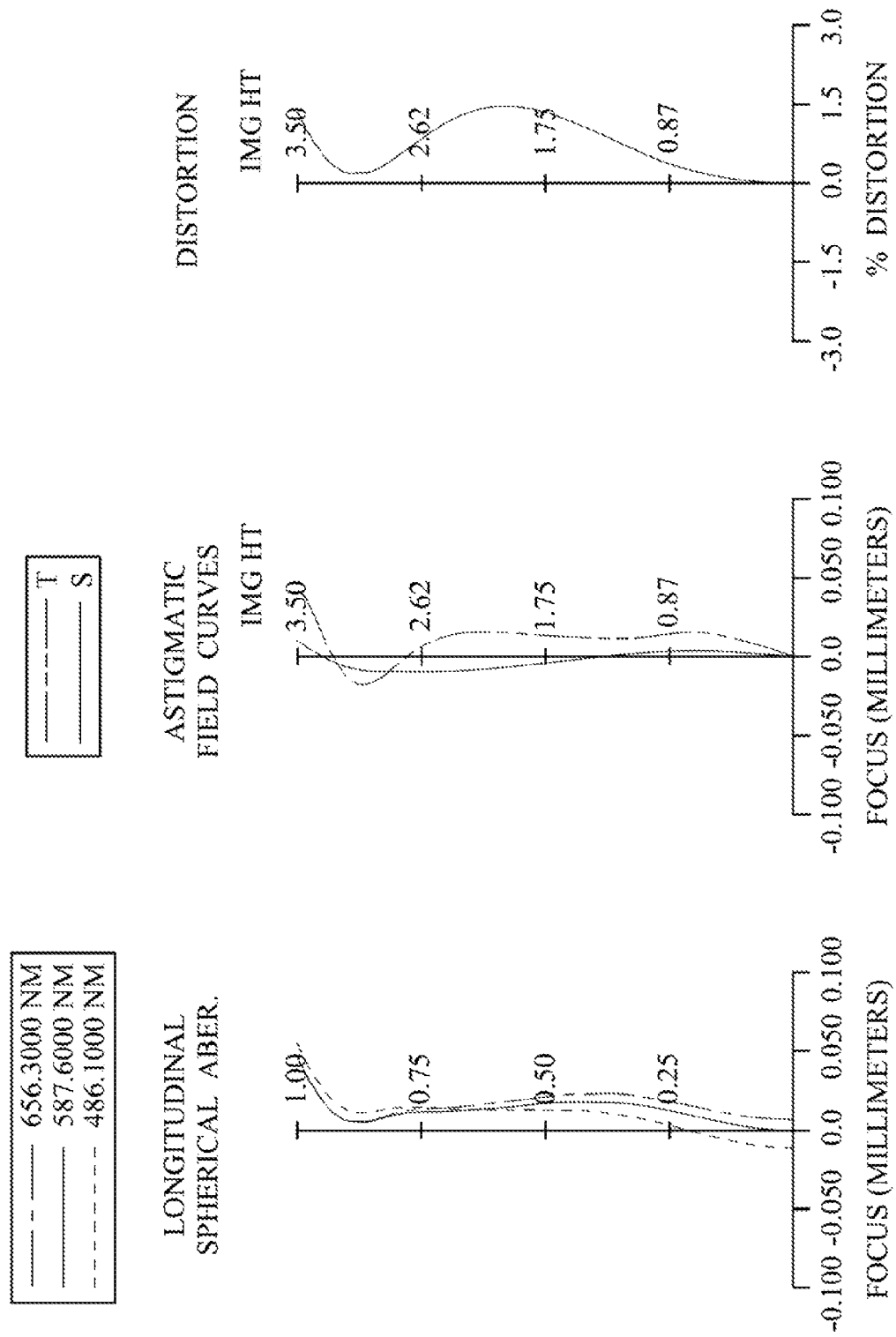
FIG. 4 shows spherical aberration curves, astigmatic field curves and a distortion curve of the optical image capturing lens assembly according to the 2nd embodiment.

FIG. 3 is a schematic view of an optical image capturing lens assembly according to the 2nd embodiment of the present disclosure. FIG. 4 shows spherical aberration curves, astigmatic field curves and a distortion curve of the optical image capturing lens assembly according to the 2nd embodiment. FIG. 3, the optical image capturing lens assembly includes, in order from an object side to an image side, an aperture stop 200, a first lens element 210, a second lens element 220, a third lens element 230 a fourth lens element 240, a fifth lens element 250, a sixth lens element 260, an IR-cut filter 280, an image plane 270, and an image sensor 290, wherein the optical image capturing lens assembly has a total of six lens elements (210-260) with refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric, wherein both of the object-side surface 211 and the image-side surface 212 of the first lens element 210 have at east one inflection point.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric, wherein both of the object-side surface 221 and the image-side surface 222 of the second lens element 220 have at least one inflection point.

The third lens element 230 with negative refractive power has an object-side surface 231 being convex in a paraxial region thereof and an image-side surface 232 being concave in a paraxial region thereof, wherein the image-side surface 232 of the third lens element 230 changes to a convex shape and then to a concave shape from the paraxial region thereof to an off-axis region thereof. The third lens element 230 is made of plastic material and has the object-side surface 231 and the image-side surface 232 being both aspheric, wherein both of the object-side surface 231 and the mage-side surface 232 of the third lens element 230 have at least one inflection point.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric, wherein both of the object-side surface 241 and the image-side surface 242 of the fourth lens element 240 have at least one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof, wherein the image-side surface 262 of the sixth lens element 260 has a convex shape in an off-axis region thereof. The sixth lens element 260 is made of plastic material and has the object-side surface 261 and the image-side surface 262 being both aspheric.

The IR-cut filter 280 made of glass material is located between the sixth lens element 260 and the image plane 270, and will not affect a focal length of the optical image capturing lens assembly.

The detailed optical data of the 2nd embodiment are shown in Table 3, and the aspheric surface data are shown in Table 4 below.

TABLE 3

2nd Embodiment
f = 4.22 mm, Fno = 2.15, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 1.993 | ASP | 0.547 | Plastic | 1.565 | 58.0 | 4.27 |
| 3 | | 10.362 | ASP | 0.250 | | | | |
| 4 | Lens 2 | −2.469 | ASP | 0.265 | Plastic | 1.640 | 23.3 | −7.10 |
| 5 | | −5.634 | ASP | 0.058 | | | | |
| 6 | Lens 3 | 2.269 | ASP | 0.265 | Plastic | 1.640 | 23.3 | −60.54 |
| 7 | | 2.046 | ASP | 0.112 | | | | |
| 8 | Lens 4 | 2.882 | ASP | 0.494 | Plastic | 1.535 | 55.7 | 7.07 |
| 9 | | 11.375 | ASP | 0.605 | | | | |
| 10 | Lens 5 | −3.162 | ASP | 0.649 | Plastic | 1.535 | 55.7 | 3.57 |
| 11 | | −1.276 | ASP | 0.124 | | | | |
| 12 | Lens 6 | 13.612 | ASP | 0.840 | Plastic | 1.535 | 55.7 | −2.75 |
| 13 | | 1.300 | ASP | 0.700 | | | | |
| 14 | IR-cut filter | Plano | | 0.200 | Glass | 1.517 | 64.2 | — |
| 15 | | Plano | | 0.343 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 2 | 3 | 4 | 5 | 6 | 7 |
| k = | −7.4974E+00 | −1.1374E+01 | −1.1322E+01 | −1.8051E+01 | 1.4972E+00 | −4.5670E−01 |
| A4 = | 9.8920E−02 | −5.6664E−02 | 3.7292E−02 | 8.7423E−02 | −1.6718E−01 | −1.2299E−01 |
| A6 = | −6.4528E−02 | −6.9849E−03 | −1.3096E−02 | −2.2345E−02 | 1.2722E−02 | −1.5802E−02 |
| A8 = | 2.5042E−02 | 1.2721E−02 | 3.8509E−02 | −1.4869E−02 | −4.5662E−02 | 1.0887E−02 |
| A10 = | −2.1703E−02 | −4.0536E−03 | −5.1442E−02 | 2.9339E−02 | 3.0391E−02 | 1.4004E−03 |
| A12 = | 1.7340E−02 | −3.3581E−02 | 6.6747E−03 | −4.5022E−02 | −4.0869E−03 | 3.6477E−03 |
| A14 = | −1.1574E−02 | 2.0664E−02 | 1.0786E−02 | 1.5045E−02 | −4.5185E−03 | |

TABLE 4-continued

Aspheric Coefficients

| Surface # | | | | | |
|---|---|---|---|---|---|
| 8 | 9 | 10 | 11 | 12 | 13 |
| k = −1.8842E+00 | 2.6464E−01 | 2.6278E+00 | −4.4774E+00 | −1.0000E+00 | −6.1679E+00 |
| A4 = −1.8845E−02 | 1.0015E−02 | 5.7178E−02 | −5.4551E−02 | −7.7670E−02 | −4.1667E−02 |
| A6 = −3.0438E−03 | −2.6715E−03 | −1.2552E−02 | 3.6918E−02 | −1.1718E−03 | 1.0225E−02 |
| A8 = −1.8151E−03 | 6.7644E−04 | −3.5010E−02 | −2.9564E−02 | 7.5690E−03 | −2.0584E−03 |
| A10 = 1.3788E−03 | −6.0460E−04 | 3.0819E−02 | 9.4023E−03 | −1.7146E−03 | 2.4935E−04 |
| A12 = 1.4676E−03 | −5.7155E−04 | −1.0493E−02 | 2.0002E−04 | 1.3046E−04 | −1.8447E−05 |
| A14 = −1.1351E−03 | −3.2419E−05 | 1.5480E−03 | −2.7523E−04 | −1.7386E−07 | 6.4668E−07 |

In the optical image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 4.22 | |Sag52|/CT5 | 1.07 |
| Fno | 2.15 | (R3 + R4)/(R3 − R4) | −2.56 |
| HFOV [deg.] | 39.2 | f/R7 | 1.46 |
| (V2 + V3)/V1 | 0.80 | f4/f3 | −0.12 |
| T34/T45 | 0.19 | f6/f5 | −0.77 |
| CT5/CT6 | 0.77 | TL/ImgH | 1.56 |

3rd Embodiment

Figure 5:
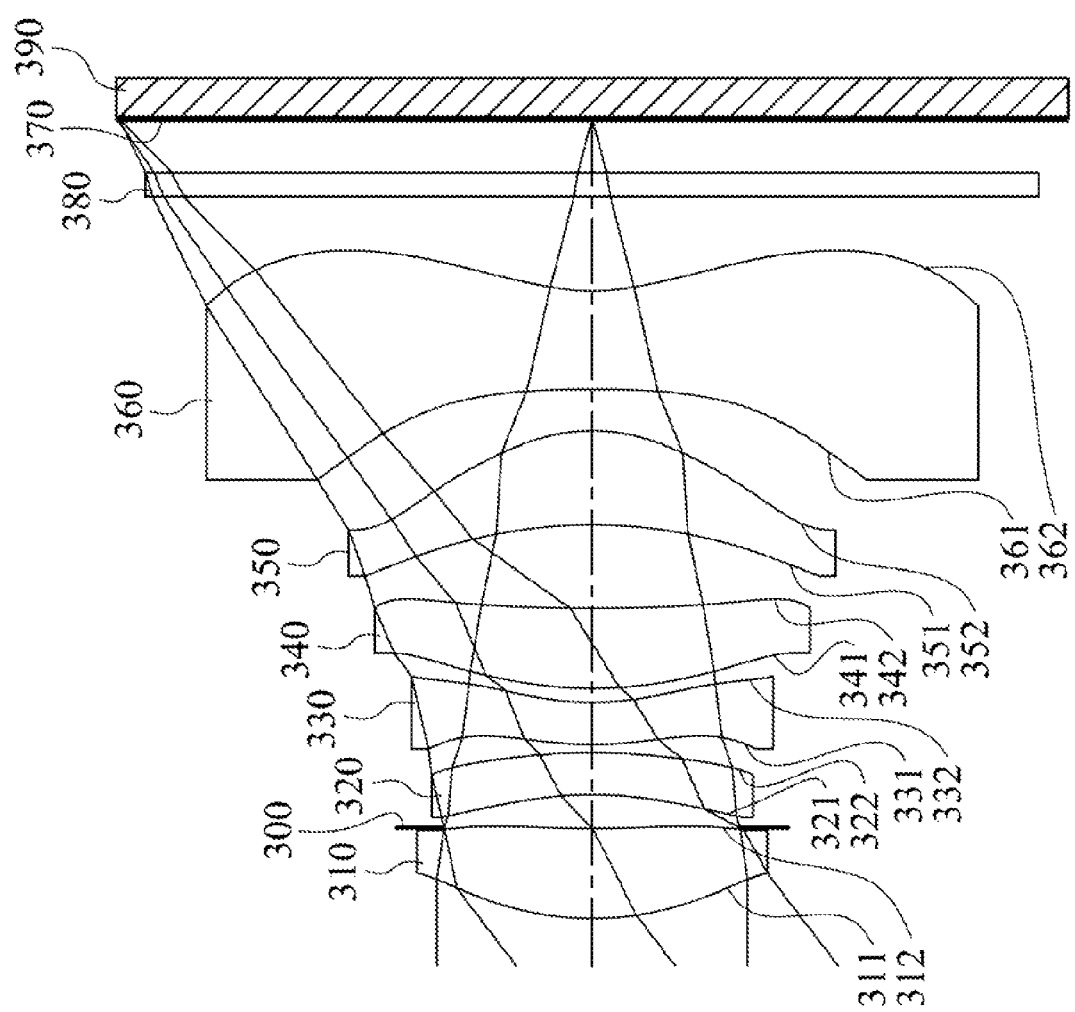
FIG. 5 is a schematic view of an optical image capturing lens assembly according to the 3rd embodiment of the present disclosure.
Figure 6:
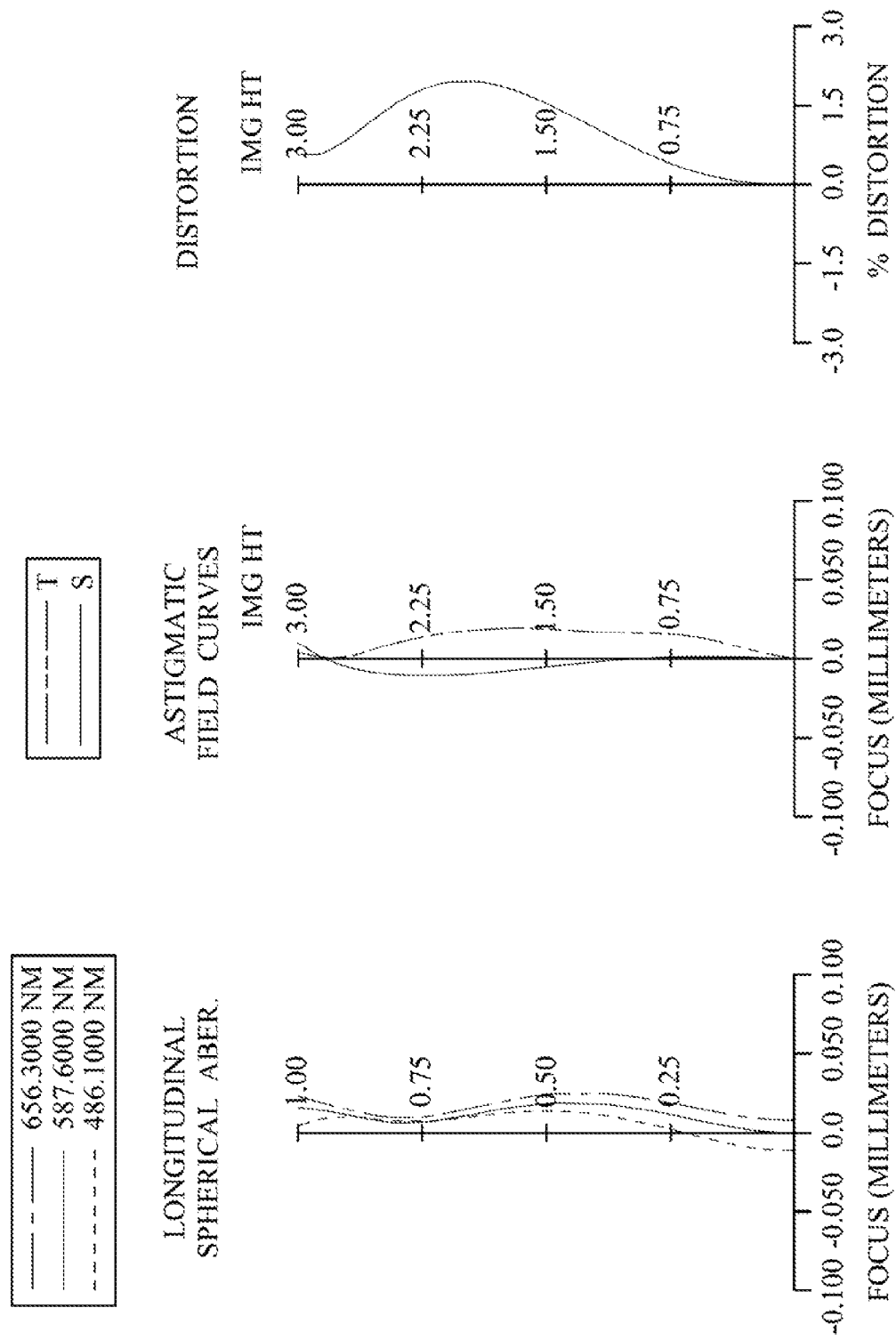
FIG. 6 shows spherical aberration curves, astigmatic field curves and a distortion curve of the optical image capturing lens assembly according to the 3rd embodiment.

FIG. 5 is a schematic view of an optical image capturing lens assembly according to the 3rd embodiment of the present disclosure. FIG. 6 shows spherical aberration curves, astigmatic field curves and a distortion curve of the optical image capturing lens assembly according to the 3rd embodiment. In FIG. 5, the optical image capturing lens assembly includes, in order from an object side to an image side a first lens element 310, an aperture stop 300, a second lens element 320, a third lens element 330, a fourth lens element 340, a fifth lens element 350, a sixth lens element 360, an IR-cut filter 380, an image plane 370, and an image sensor 390, wherein the optical image capturing lens assembly has a total of six lens elements (310-360) with refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric, wherein both of the object-side surface 311 and the image-side surface 312 of the first lens element 310 have at least one inflection point.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof, wherein the image-side surface 332 of the third lens element 330 changes to a convex shape and then to a concave shape from the paraxial region thereof to an off-axis region thereof. The third lens element 330 is made of plastic material and has the object-side surface 331 and the image-side surface 332 being both aspheric, wherein both of the object-side surface 331 and the image-side surface 332 of the third lens element 330 have at least one inflection point.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric, wherein both of the object-side surface 341 and the image-side surface 342 of the fourth lens element 340 have at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof, wherein the image-side surface 362 of the sixth lens element 360 has a convex shape in an off-axis region thereof. The sixth lens element 360 is made of plastic material and has the object-side surface 361 and the image-side surface 362 being both aspheric.

The IR-cut filter 380 made of glass material is located between the sixth lens element 360 and the image plane 370, and will not affect a focal length of the optical image capturing lens assembly.

The detailed optical data of the 3rd embodiment are shown in Table 5, and the aspheric surface data are shown in Table 6 below.

TABLE 5

3rd Embodiment
f = 3.88 mm, Fno = 2.00, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.878 | ASP | 0.570 | Plastic | 1.544 | 55.9 | 4.25 |
| 2 | | 8.890 | ASP | 0.001 | | | | |
| 3 | Ape. Stop | Plano | | 0.211 | | | | |
| 4 | Lens 2 | −2.204 | ASP | 0.265 | Plastic | 1.650 | 21.4 | −9.67 |
| 5 | | −3.555 | ASP | 0.052 | | | | |
| 6 | Lens 3 | 2.223 | ASP | 0.265 | Plastic | 1.634 | 23.8 | −16.36 |
| 7 | | 1.746 | ASP | 0.086 | | | | |
| 8 | Lens 4 | 2.612 | ASP | 0.510 | Plastic | 1.544 | 55.9 | 5.89 |
| 9 | | 13.120 | ASP | 0.523 | | | | |
| 10 | Lens 5 | −3.002 | ASP | 0.594 | Plastic | 1.544 | 55.9 | 2.83 |
| 11 | | −1.088 | ASP | 0.265 | | | | |
| 12 | Lens 6 | −7.836 | ASP | 0.618 | Plastic | 1.514 | 56.8 | −2.21 |
| 13 | | 1.365 | ASP | 0.600 | | | | |
| 14 | IR-cut filter | Plano | | 0.150 | Glass | 1.517 | 64.2 | — |
| 15 | | Plano | | 0.341 | | | | |
| 16 | Image | Plano | | — | | | | |

Note:
Reference wavelength is 587.6 nm (d-line).

TABLE 6

Aspheric Coefficients

| | Surface # | | | | | |
|---|---|---|---|---|---|---|
| | 1 | 2 | 4 | 5 | 6 | 7 |
| k = | −7.5588E+00 | −1.0000E+00 | −9.2823E+00 | 1.4505E+00 | 1.0208E+00 | −8.4519E−01 |
| A4 = | 1.2301E−01 | −6.7974E−02 | 3.7761E−02 | 8.1708E−02 | −2.5789E−01 | −1.7486E−01 |
| A6 = | −9.9183E−02 | −6.5575E−03 | −5.3297E−02 | −5.7692E−02 | 2.2606E−02 | 6.2758E−04 |
| A8 = | 6.2569E−02 | −6.8758E−03 | 6.9875E−02 | −2.4905E−02 | −8.0391E−02 | 2.6387E−02 |
| A10 = | −3.7923E−02 | 1.2911E−02 | −6.4461E−02 | 7.0138E−02 | 6.0386E−02 | −1.1693E−02 |
| A12 = | 4.1978E−03 | −9.0365E−03 | 4.1613E−02 | −8.7488E−02 | −3.7726E−02 | 9.2798E−03 |
| A14 = | −2.6049E−04 | 1.9103E−03 | −1.5988E−02 | 3.4127E−02 | 2.6679E−02 | |

| | Surface # | | | | | |
|---|---|---|---|---|---|---|
| | 8 | 9 | 10 | 11 | 12 | 13 |
| k = | −4.7357E−01 | 2.2847E+00 | 3.0000E+00 | −3.6786E+00 | −1.0000E+00 | −7.2177E+00 |
| A4 = | −2.2144E−02 | 1.3272E−02 | 2.8864E−02 | −9.1990E−02 | −6.0005E−02 | −5.3984E−02 |
| A6 = | 4.0361E−03 | −3.9918E−03 | 2.2347E−02 | 7.0495E−02 | −1.4092E−02 | 1.6567E−02 |
| A8 = | −3.4959E−03 | 4.9928E−03 | −6.7277E−02 | −5.4254E−02 | 1.5034E−02 | −4.2603E−03 |
| A10 = | −1.7438E−03 | −2.8587E−03 | 6.9896E−02 | 2.2709E−02 | −3.9624E−03 | 6.7692E−04 |
| A12 = | 2.7788E−03 | −2.7051E−03 | −3.0495E−02 | 3.9992E−04 | 3.5504E−04 | −6.6536E−05 |
| A14 = | −2.2928E−03 | 4.3637E−04 | 5.3389E−03 | −1.1594E−03 | 1.3771E−05 | 2.9695E−06 |

In the optical image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 3.88 | |Sag52|/CT5 | 1.06 |
| Fno | 2.00 | (R3 + R4)/(R3 − R4) | −4.26 |
| HFOV [deg.] | 37.5 | f/R7 | 1.49 |
| (V2 + V3)/V1 | 0.81 | f4/f3 | −0.36 |
| T34/T45 | 0.16 | f6/f5 | −0.78 |
| CT5/CT6 | 0.96 | TL/ImgH | 1.68 |

4th Embodiment

Figure 7:
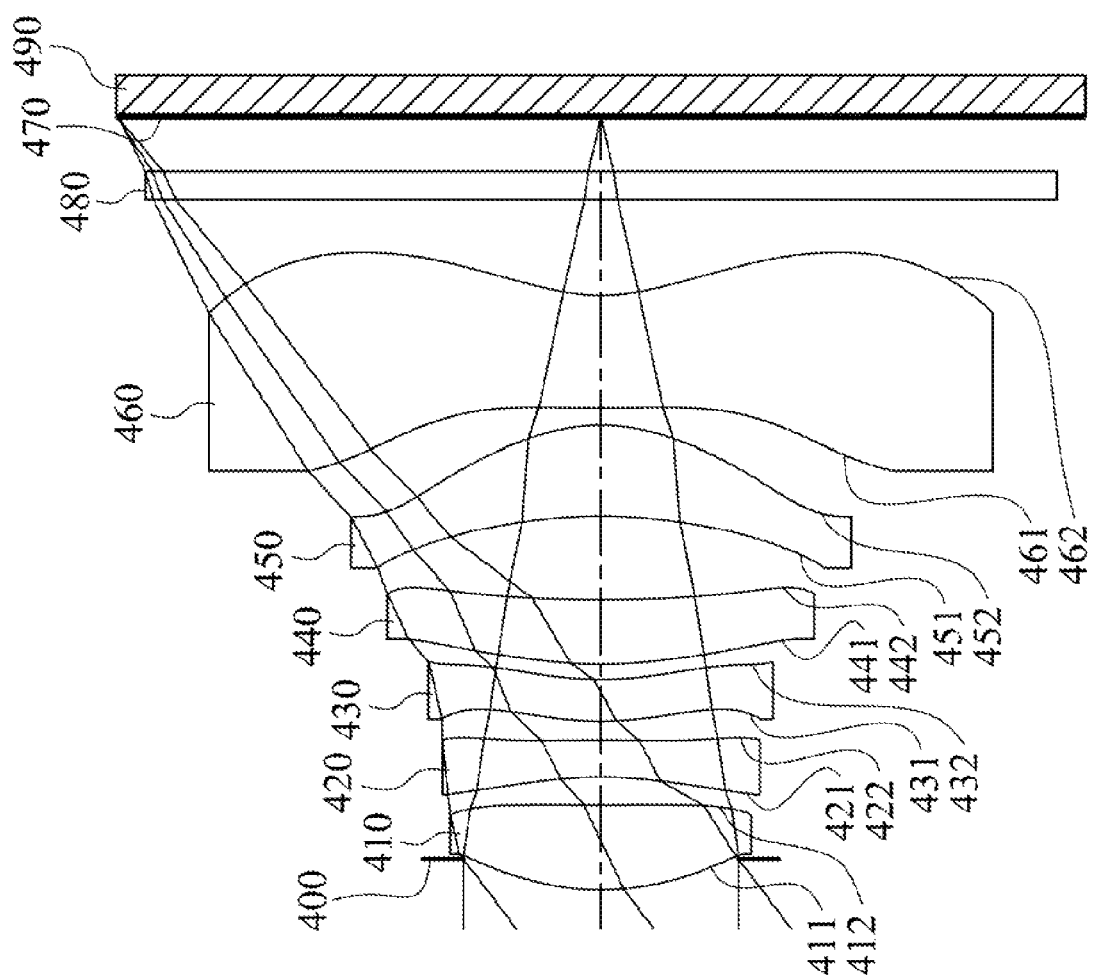
FIG. 7 is a schematic view of an optical image capturing lens assembly according to the 4th embodiment of the present disclosure.
Figure 8:
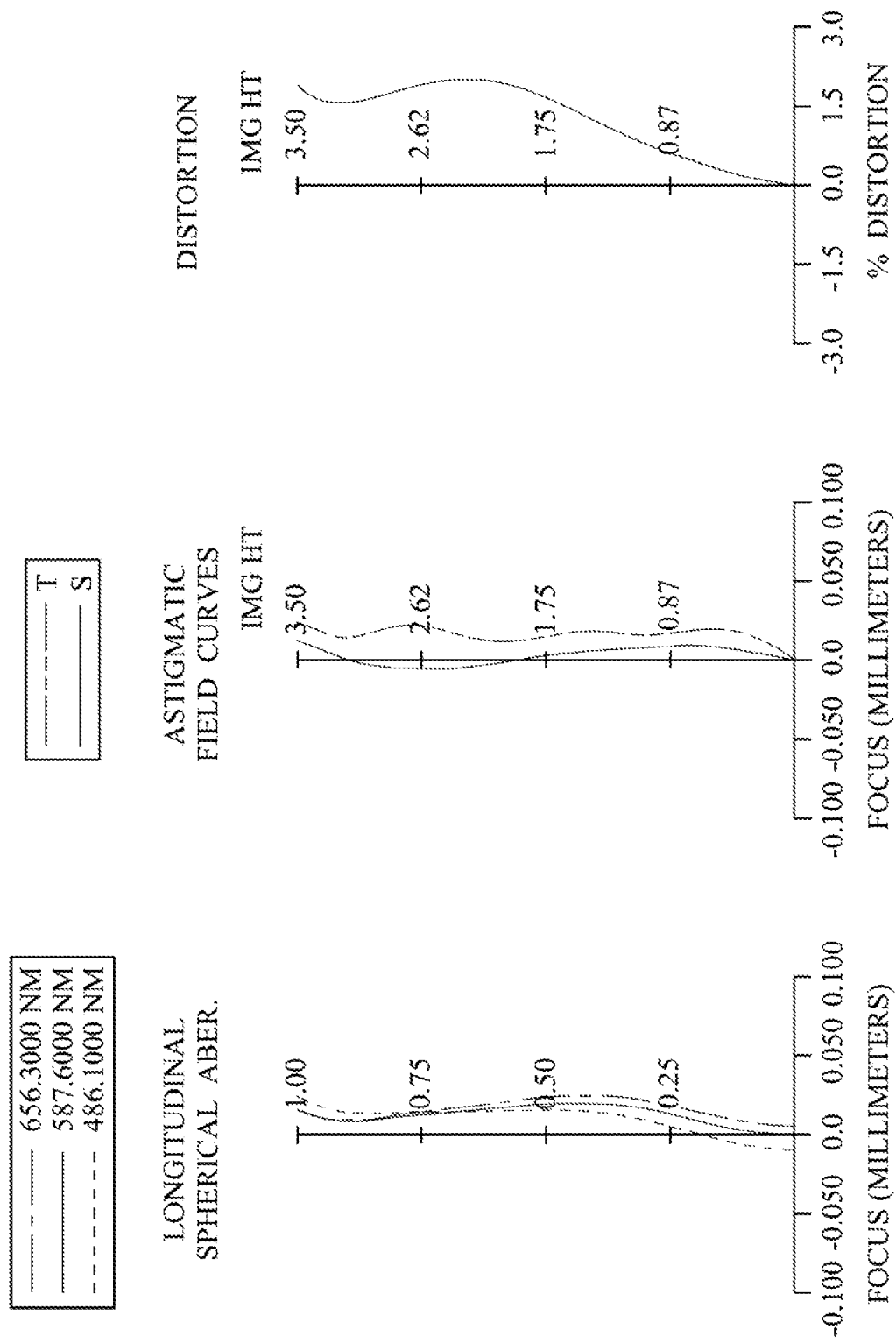
FIG. 8 shows spherical aberration curves, astigmatic field curves and a distortion curve of the optical image capturing lens assembly according to the 4th embodiment.

FIG. 7 is a schematic view of an optical image capturing lens assembly to according to the 4th embodiment of the present disclosure. FIG. 8 shows spherical aberration curves, astigmatic field curves and a distortion curve of the optical image capturing lens assembly according to the 4th embodiment. In FIG. 7, the optical image capturing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470, and an image sensor 490, wherein the optical image capturing lens assembly has a total of six lens elements (410-460) with refractive power.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric, wherein both of the object-side surface 411 and the image-side surface 412 of the first lens element 410 have at least one inflection point.

The second lens element 420 with negative refractive power has an object-side surface 421 being concave in a paraxial region thereof and an image-side surface 422 being convex in a paraxial region thereof. The second lens element 420 is made of plastic material and has the object side surface 421 and the image-side surface 422 being both aspheric, wherein both of the object-side surface 421 and the image-side surface 422 of the second lens element 420 have at least one inflection point.

The third lens element 430 with positive refractive power has an object-side surface 431 being convex in a paraxial region thereof and an image-side surface 432 being concave in a paraxial region thereof, wherein the image-side surface 432 of the third lens element 430 changes to a convex shape and then to a concave shape from the paraxial region thereof to an off-axis region thereof. The third lens element 430 is made of plastic material and has the object-side surface 431 and the image-side surface 432 being both aspheric, wherein both of the object-side surface 431 and the image-side surface 432 of the third lens element 430 have at least one inflection point.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric, wherein both of the object-side surface 441 and the image-side surface 442 of the fourth lens element 440 have at least one inflection point.

The fifth lens element 450 with positive refractive power has an object-side surface 451 being concave in a paraxial region thereof and an image-side surface 452 being convex ill a paraxial region thereof. The fifth lens element 450 is made of plastic material and has the object-side surface 451 and the image-side surface 452 being both aspheric.

The sixth lens element 460 with negative refractive power has an to object-side surface 461 being convex in a paraxial region thereof and an image-side surface 462 being concave in a paraxial region thereof, wherein the image-side surface 462 of the sixth lens element 460 has a convex shape in an off-axis region thereof. The sixth lens element 460 is made of plastic material and has the object-side surface 461 and the image-side surface 462 being both aspheric.

The IR-cut filter 480 made of glass material is located between the sixth lens element 460 and the image plane 470, and will not affect a focal length of the optical image capturing lens assembly.

The detailed optical data of the 4th embodiment are shown in Table 7, and the aspheric surface data are shown in Table 8 below.

TABLE 7

4th Embodiment
f = 4.47 mm, Fno = 2.25, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 1.934 | ASP | 0.618 | Plastic | 1.544 | 55.9 | 3.76 |
| 3 | | 31.010 | ASP | 0.203 | | | | |
| 4 | Lens 2 | −2.741 | ASP | 0.265 | Plastic | 1.634 | 23.8 | −5.00 |
| 5 | | −20.940 | ASP | 0.138 | | | | |
| 6 | Lens 3 | 2.248 | ASP | 0.297 | Plastic | 1.634 | 23.8 | 47.51 |
| 7 | | 2.305 | ASP | 0.112 | | | | |
| 8 | Lens 4 | 3.241 | ASP | 0.470 | Plastic | 1.514 | 56.8 | 9.01 |
| 9 | | 10.296 | ASP | 0.605 | | | | |
| 10 | Lens 5 | −3.291 | ASP | 0.654 | Plastic | 1.535 | 55.7 | 3.59 |
| 11 | | −1.297 | ASP | 0.125 | | | | |
| 12 | Lens 6 | 13.612 | ASP | 0.812 | Plastic | 1.535 | 55.7 | −2.76 |
| 13 | | 1.303 | ASP | 0.700 | | | | |
| 14 | IR-cut filter | Plano | | 0.200 | Glass | 1.517 | 64.2 | — |
| 15 | | Plano | | 0.401 | | | | |
| 16 | Image | Plano | | — | | | | |

Note:
Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | −6.7230E+00 | −1.4374E+01 | −1.2756E+01 | −1.9992E+01 | 1.6584E+00 | −1.7621E−01 |
| A4 = | 1.0463E−01 | −3.9820E−02 | 4.7630E−02 | 5.9605E−02 | −1.9327E−01 | −1.3407E−01 |
| A6 = | −7.0702E−02 | −2.6717E−02 | −3.9465E−02 | 2.6577E−02 | 9.1915E−02 | 2.6591E−02 |
| A8 = | 5.1654E−02 | 7.5518E−02 | 1.0274E−01 | −4.6479E−02 | −1.5668E−01 | −2.5924E−02 |

TABLE 8-continued

| Aspheric Coefficients | | | | | |
|---|---|---|---|---|---|
| A10 = | −5.7235E−02 | −1.1364E−01 | −1.6502E−01 | −2.8028E−03 | 1.2067E−01 | 1.0064E−02 |
| A12 = | 4.2044E−02 | 6.1075E−02 | 1.0574E−01 | 8.7733E−03 | −6.5559E−02 | 3.8403E−03 |
| A14 = | −1.8349E−02 | −1.2951E−02 | −2.2477E−02 | −3.6717E−03 | 1.4710E−02 | |

| | Surface # | | | | |
|---|---|---|---|---|---|
| | 8 | 9 | 10 | 11 | 12 | 13 |
| k = | −2.0077E+00 | 2.3113E+00 | 2.6353E+00 | −5.4095E+00 | −1.0000E+00 | −6.1679E+00 |
| A4 = | −4.8191E−02 | 1.2845E−02 | 7.3438E−02 | −8.5212E−02 | −9.0693E−02 | −4.9321E−02 |
| A6 = | 1.7341E−02 | −2.8770E−02 | −4.4966E−02 | 8.3272E−02 | 5.8289E−03 | 1.4098E−02 |
| A8 = | −9.8123E−03 | 3.8214E−02 | −1.0112E−03 | −7.5571E−02 | 6.6741E−03 | −3.0733E−03 |
| A10 = | 1.2154E−02 | −2.4085E−02 | 1.5395E−02 | 3.7796E−02 | −1.8583E−03 | 4.0562E−04 |
| A12 = | −5.9765E−03 | 6.9340E−03 | −6.0881E−03 | −8.2711E−03 | 2.1527E−04 | −3.0270E−05 |
| A14 = | 7.2203E−04 | −9.4154E−04 | 7.4459E−04 | 6.4478E−04 | −1.0926E−05 | 9.6919E−07 |

In the optical image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 4.47 | |Sag52|/CT5 | 1.01 |
| Fno | 2.25 | (R3 + R4)/(R3 − R4) | −1.30 |
| HFOV [deg.] | 37.4 | f/R7 | 1.38 |
| (V2 + V3)/V1 | 0.85 | f4/f3 | 0.19 |
| T34/T45 | 0.19 | f6/f5 | −0.77 |
| CT5/CT6 | 0.81 | TL/ImgH | 1.60 |

5th Embodiment

Figure 9:
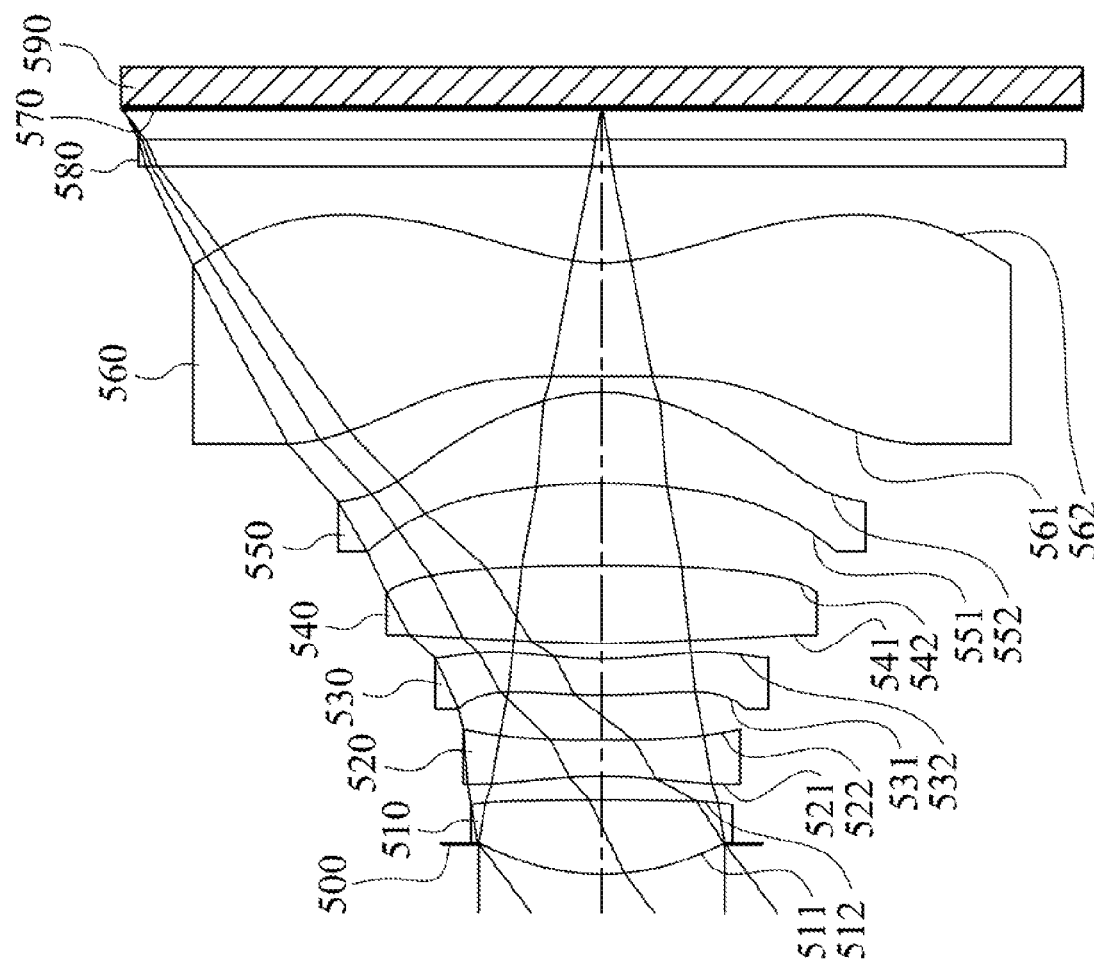
FIG. 9 is a schematic view of an optical image capturing lens assembly according to the 5th embodiment of the present disclosure.
Figure 10:
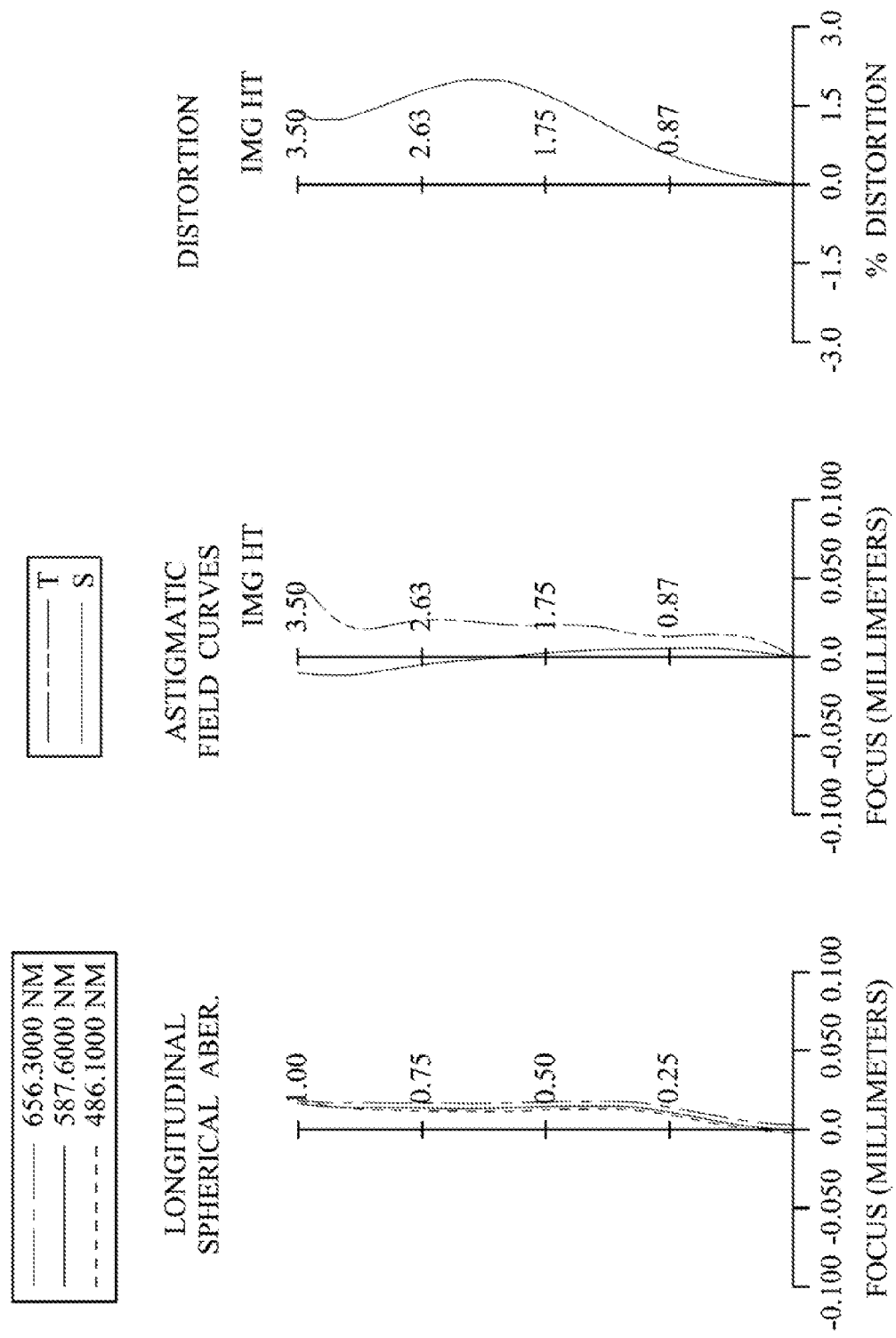
FIG. 10 shows spherical aberration curves, astigmatic field curves and a distortion curve of the optical image capturing lens assembly according to the 5th embodiment.

FIG. 9 is a schematic view of an optical image capturing lens assembly according to the 5th embodiment of the present disclosure. FIG. 10 shows spherical aberration curves, astigmatic field curves and a distortion curve of the optical image capturing lens assembly according to the 5th embodiment. In FIG. 9, the optical image capturing lens assembly includes, in order from an to object side to an image side, an aperture stop 500, a first lens element 510, a second lens element 520, a third lens element 530, a fourth lens element 540, a fifth lens element 550, a sixth lens element 560, an IR-cut filter 580, an image plane 570, and an image sensor 590, wherein the optical image capturing lens assembly has a total of six lens elements (510-560) with refractive power.

The first lens element 510 with positive refractive power has object-side surface 511 being convex in a paraxial region thereof and an image-side surface 512 being convex in a paraxial region thereof. The first lens element 510 is made of glass material and has the object-side surface 511 and the image-side surface 512 being both aspheric, wherein the object-side surface 511 of the first lens element 510 has at least one inflection point.

The second lens element 520 with negative refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric, wherein both of the object-side surface 521 and the image-side surface 522 of the second lens element 520 have at least one inflection point.

The third lens element 530 with negative refractive power has an object-side surface 531 being convex in a paraxial region thereof and an to image-side surface 532 being concave in a paraxial region thereof, wherein the image-side surface 532 of the third lens element 530 changes to a convex shape and then to a concave shape from the paraxial region thereof to an off-axis region thereof. The third lens element 530 is made of plastic material and has the object-side surface 531 and the image-side surface 532 being both aspheric, wherein both of the object-side surface 531 and the image-side surface 532 of the third lens element 530 have at least one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the age-side surface 542 being both aspheric, wherein the object-side surface 541 of the fourth lens element 540 has at least one inflection point.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an age-side surface 562 being concave in a paraxial region thereof, wherein the image-side surface 562 of the sixth lens element 560 has a convex shape in an off-axis region thereof. The sixth lens element 560 is made of plastic material and has the object-side surface 561 and the image-side surface 562 being both to aspheric.

The IR-cut filter 580 made of glass material is located between the sixth lens element 560 and the image plane 570, and will not affect a focal length of the optical image capturing lens assembly.

The detailed optical data of the 5th embodiment are shown in Table 9, and the aspheric surface data are shown in Table 10 below.

TABLE 9

5th Embodiment
f = 4.49 mm, Fno = 2.50, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 1.806 | ASP | 0.547 | Glass | 1.542 | 62.9 | 3.12 |
| 3 | | −24.138 | ASP | 0.172 | | | | |
| 4 | Lens 2 | −3.013 | ASP | 0.265 | Plastic | 1.583 | 30.2 | −5.39 |
| 5 | | −73.655 | ASP | 0.326 | | | | |
| 6 | Lens 3 | 4.565 | ASP | 0.265 | Plastic | 1.634 | 23.8 | −17.53 |
| 7 | | 3.163 | ASP | 0.112 | | | | |
| 8 | Lens 4 | 6.010 | ASP | 0.571 | Plastic | 1.544 | 55.9 | 8.77 |
| 9 | | −22.402 | ASP | 0.600 | | | | |
| 10 | Lens 5 | −4.097 | ASP | 0.662 | Plastic | 1.514 | 56.8 | 3.35 |
| 11 | | −1.278 | ASP | 0.121 | | | | |
| 12 | Lens 6 | −117.862 | ASP | 0.826 | Plastic | 1.535 | 55.7 | −2.41 |
| 13 | | 1.307 | ASP | 0.700 | | | | |
| 14 | IR-cut filter | Plano | | 0.200 | Glass | 1.517 | 64.2 | — |
| 15 | | Plano | | 0.233 | | | | |
| 16 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | −5.7584E+00 | −1.4374E+01 | −1.2755E+01 | −1.9992E+01 | 1.9047E+00 | −1.2598E+00 |
| A4 = | 1.1485E−01 | 2.2117E−02 | 1.8188E−01 | 2.1405E−01 | −1.2603E−01 | −1.6771E−01 |
| A6 = | −5.7439E−02 | −6.4869E−02 | −2.6891E−01 | −2.7454E−01 | 2.4110E−02 | 1.0764E−01 |
| A8 = | 1.1267E−02 | 1.3220E−01 | 3.3856E−01 | 2.9287E−01 | −8.2142E−02 | −1.1707E−01 |
| A10 = | 9.6540E−03 | −2.8701E−01 | −3.8278E−01 | −2.8315E−01 | −9.7693E−03 | 5.3010E−02 |
| A12 = | −1.7465E−02 | 2.6869E−01 | 2.9487E−01 | 1.8736E−01 | 3.7484E−02 | −1.9393E−03 |
| A14 = | −3.1171E−03 | −9.7489E−02 | −8.8993E−02 | −5.6569E−02 | −1.6919E−02 | |

| Surface # | 8 | 9 | 10 | 11 | 12 | 13 |
|---|---|---|---|---|---|---|
| k = | −1.9779E+00 | 2.3113E+00 | 2.2650E+00 | −5.1784E+00 | −1.0000E+00 | −6.2259E+00 |
| A4 = | −7.5845E−02 | −5.0307E−03 | 4.9896E−02 | −7.1128E−02 | −7.4071E−02 | −4.2604E−02 |
| A6 = | 2.3885E−02 | −3.2387E−02 | −4.2314E−02 | 5.6919E−02 | −5.4727E−03 | 1.2093E−02 |
| A8 = | 1.5235E−02 | 2.7300E−02 | −6.3337E−03 | −5.5722E−02 | 1.3414E−02 | −2.5413E−03 |
| A10 = | −8.3760E−03 | −4.3887E−03 | 1.6354E−02 | 2.8318E−02 | −3.6730E−03 | 3.1679E−04 |
| A12 = | −7.6896E−04 | −2.9217E−03 | −6.1782E−03 | −6.1123E−03 | 4.2432E−04 | −2.1776E−05 |
| A14 = | 6.1830E−04 | 7.6415E−04 | 7.6079E−04 | 4.7039E−04 | −1.8803E−05 | 6.4029E−07 |

In the optical image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 4.49 | |Sag52|/CT5 | 1.20 |
| Fno | 2.50 | (R3 + R4)/(R3 − R4) | −1.09 |
| HFOV [deg.] | 37.5 | f/R7 | 0.75 |
| (V2 + V3)/V1 | 0.86 | f4/f3 | −0.50 |
| T34/T45 | 0.19 | f6/f5 | −0.72 |
| CT5/CT6 | 0.80 | TL/ImgH | 1.60 |

6th Embodiment

Figure 11:
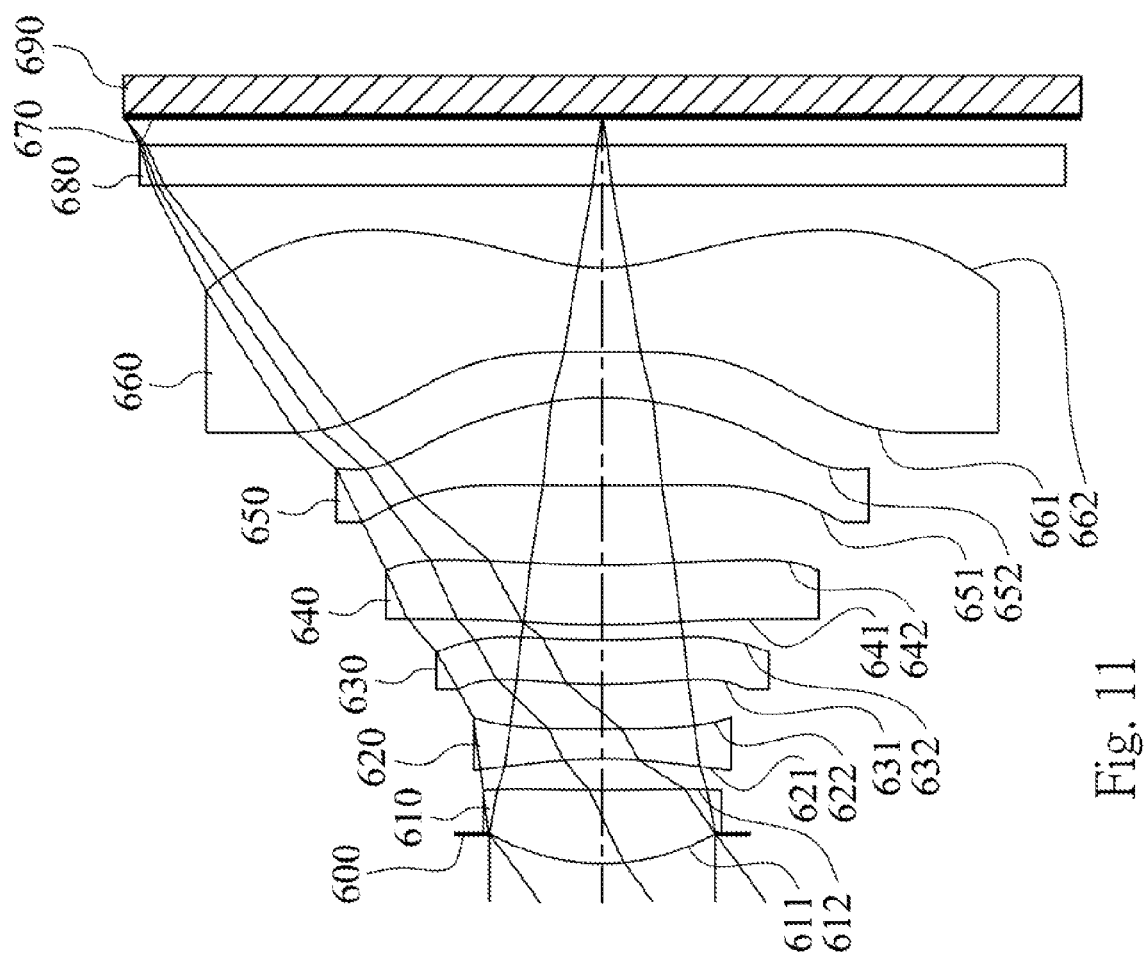
FIG. 11 is a schematic view of an optical image capturing lens assembly according to the 6th embodiment of the present disclosure.
Figure 12:
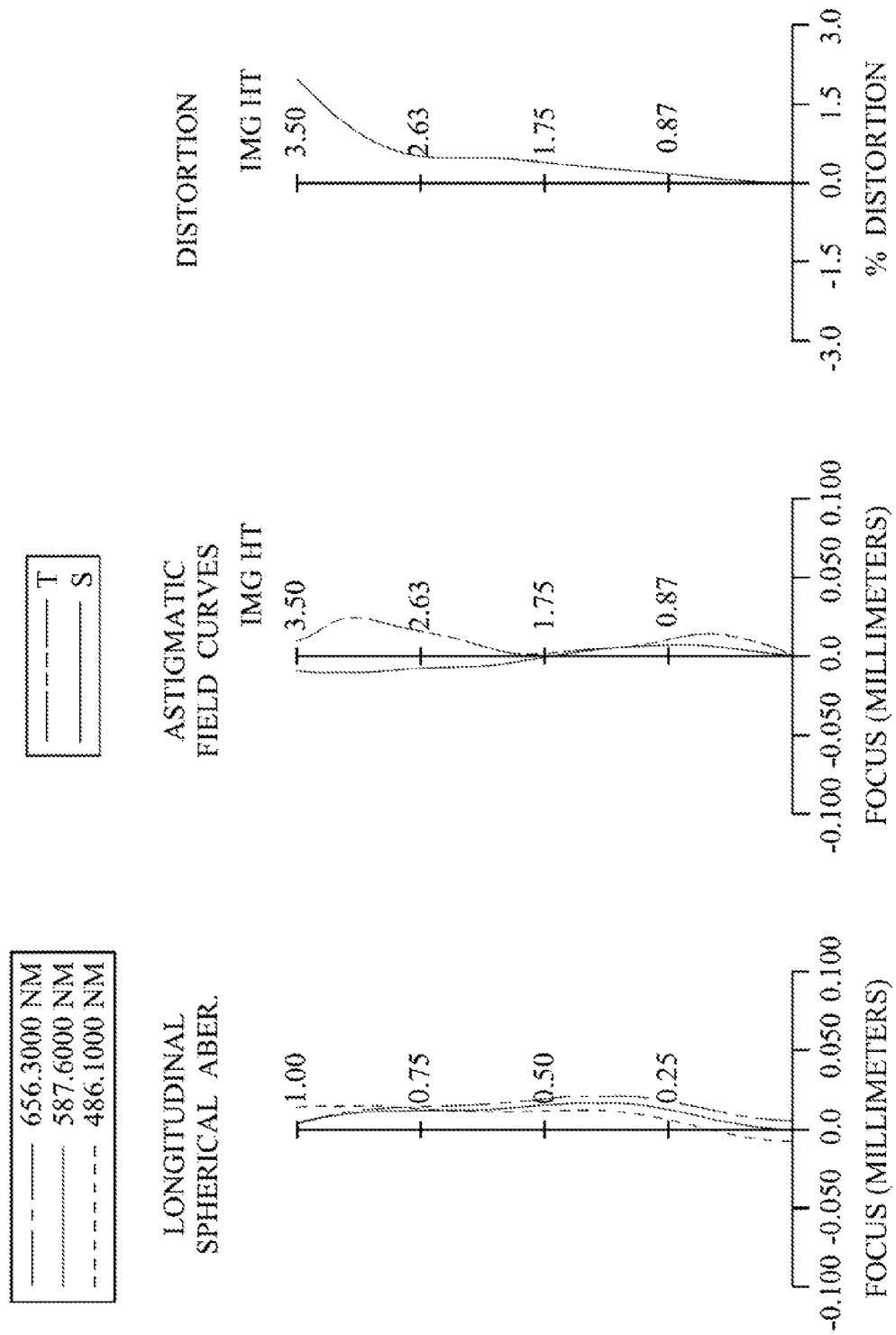
FIG. 12 shows spherical aberration curves, astigmatic field curves and a distortion curve of the optical image capturing lens assembly according to the to 6th embodiment.

FIG. 11 is a schematic view of an optical image capturing lens assembly according to the 6th embodiment of the present disclosure. FIG. 12 shows spherical aberration curves, astigmatic field curves and a distortion curve of the optical image capturing lens assembly according to the 6th embodiment. FIG. 11, the optical image capturing lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680, an image plane 670, and an image sensor 690, wherein the optical image capturing lens assembly has a total of six lens elements (610-660) with refractive power.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric, wherein the image-side surface 612 of the first lens element 610 has at least one inflection point.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric, wherein both of the object-side surface 621 and the image-side surface 622 of the second lens element 620 have at least one inflection point.

The third lens element 630 with positive refractive power has an object-side surface 631 being convex in a paraxial region thereof and an age-side surface 632 being concave in a paraxial region thereof, wherein the image-side surface 632 of the third lens element 630 changes to a convex shape and then to a concave shape from the paraxial region thereof to an off-axis region thereof. The third lens element 630 is made of plastic material and has the object-side surface 631 and the image-side surface 632 being both aspheric, wherein both of the object-side surface 631 and the image-side surface 632 of the third lens element 630 have at least one inflection point.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 at and the image-side surface 642 being both aspheric, wherein both of the object-side surface 641 and the image-side surface 642 of the fourth lens element 640 have at least one inflection point.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof, wherein the image-side surface 662 of the sixth lens element 660 has a convex shape in an off-axis region thereof. The sixth lens element 660 is made of plastic material and has the object-side surface 661 and the image-side surface 662 being both aspheric.

The IR-cut filter 680 made of glass material is located between the sixth lens element 660 and the image plane 670, and will not affect a focal length of the optical image capturing lens assembly.

The detailed optical data of the 6th embodiment are shown in Table 11, and the aspheric surface data are shown in Table 12 below.

TABLE 11

6th Embodiment
f = 4.63 mm, Fno = 2.80, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 1.625 | ASP | 0.544 | Plastic | 1.514 | 56.8 | 3.32 |
| 3 | | 31.520 | ASP | 0.227 | | | | |
| 4 | Lens 2 | −3.105 | ASP | 0.220 | Plastic | 1.633 | 23.4 | −4.96 |
| 5 | | −317.306 | ASP | 0.322 | | | | |
| 6 | Lens 3 | 4.403 | ASP | 0.328 | Plastic | 1.583 | 30.2 | 16.69 |
| 7 | | 7.817 | ASP | 0.112 | | | | |
| 8 | Lens 4 | 7.516 | ASP | 0.431 | Plastic | 1.514 | 56.8 | −131.62 |
| 9 | | 6.632 | ASP | 0.587 | | | | |
| 10 | Lens 5 | 100.000 | ASP | 0.643 | Plastic | 1.514 | 56.8 | 3.85 |
| 11 | | −2.015 | ASP | 0.335 | | | | |
| 12 | Lens 6 | 100.000 | ASP | 0.616 | Plastic | 1.514 | 56.8 | −2.67 |
| 13 | | 1.348 | ASP | 0.600 | | | | |
| 14 | IR-cut filter | Plano | | 0.300 | Glass | 1.517 | 64.2 | — |
| 15 | | Plano | | 0.207 | | | | |
| 16 | Image | Plano | | — | | | | |

Note:
Reference wavelength is 587.6 nm (d-line).

TABLE 12

Aspheric Coefficients

| | Surface # | | | | | |
|---|---|---|---|---|---|---|
| | 2 | 3 | 4 | 5 | 6 | 7 |
| k = | −4.4009E+00 | −5.0000E+01 | −1.3448E+01 | −5.0000E+01 | 3.1408E+00 | −5.9395E+00 |
| A4 = | 1.2713E−01 | 9.6975E−03 | 1.0942E−01 | 1.5589E−01 | −4.8710E−02 | 5.8790E−02 |
| A6 = | −2.3463E−02 | −8.1348E−02 | −1.8402E−01 | −1.5141E−01 | −1.2065E−01 | −3.6903E−01 |
| A8 = | −5.2214E−02 | 2.4233E−01 | 3.4788E−01 | 2.1730E−01 | 9.4471E−03 | 4.3764E−01 |
| A10 = | 1.2952E−01 | −4.7718E−01 | −5.6569E−01 | −2.4966E−01 | 2.5827E−01 | −3.0125E−01 |

TABLE 12-continued

| Aspheric Coefficients | | | | | |
|---|---|---|---|---|---|
| A12 = | −1.3096E−01 | 3.7614E−01 | 4.6527E−01 | 1.8162E−01 | −5.1584E−01 | 1.0954E−01 |
| A14 = | 3.9156E−02 | −1.1110E−01 | −1.3348E−01 | −4.4883E−02 | 4.0225E−01 | −1.7760E−02 |
| A16 = | −4.3834E−13 | 3.8441E−13 | −1.1176E−12 | 2.7052E−12 | −1.1628E−01 | 2.3260E−03 |

| | Surface # | | | | | |
|---|---|---|---|---|---|---|
| | 8 | 9 | 10 | 11 | 12 | 13 |
| k = | −2.0297E+00 | 2.3992E+00 | 4.8590E+01 | −1.2406E+01 | −1.0000E+00 | −6.2112E+00 |
| A4 = | 5.3356E−02 | −3.4150E−02 | 2.6930E−02 | −5.6048E−02 | −1.5352E−01 | −6.9275E−02 |
| A6 = | −2.6130E−01 | −4.6799E−02 | −5.6796E−02 | 4.4964E−02 | 4.8779E−02 | 2.5460E−02 |
| A8 = | 2.9938E−01 | 6.4930E−02 | 1.6438E−02 | −4.9964E−02 | −9.1526E−03 | −6.2621E−03 |
| A10 = | −1.3986E−01 | −2.9040E−02 | −1.8001E−04 | 2.6628E−02 | 2.7395E−03 | 9.4408E−04 |
| A12 = | 1.1708E−02 | 4.0778E−03 | 1.4633E−04 | −6.0673E−03 | −7.0473E−04 | −8.6709E−05 |
| A14 = | 1.0243E−02 | −1.1033E−04 | −4.0502E−04 | 5.5184E−04 | 8.8788E−05 | 4.5187E−06 |
| A16 = | −2.2981E−03 | 5.2446E−05 | 7.7797E−05 | −1.0924E−05 | −4.2126E−06 | −1.0457E−07 |

In the optical image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 4.63 | |Sag52|/CT5 | 0.81 |
| Fno | 2.80 | (R3 + R4)/(R3 − R4) | −1.02 |
| HFOV [deg.] | 36.5 | f/R7 | 0.62 |
| (V2 + V3)/V1 | 0.94 | f4/f3 | −7.91 |
| T34/T45 | 0.19 | f6/f5 | −0.69 |
| CT5/CT6 | 1.04 | TL/ImgH | 1.56 |

The foregoing description, for purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing lens assembly comprising, in order from an object side to an image side:
    a first lens element with positive refractive power having an object-side surface being convex in a paraxial region thereof;
    a second lens element with negative refractive power having an object-side surface being concave in a paraxial region thereof and an image-side surface being convex in a paraxial region thereof;
    a third lens element having refractive power;
    a fourth lens element with refractive power having an object-side surface being convex in a paraxial region thereof;
    a fifth lens element with positive refractive power having an image-side surface being convex in a paraxial region thereof; and
    a sixth lens element with refractive power having an image-side surface being concave in a paraxial region, wherein the image-side surface of the sixth lens element has at least one convex shape in an off-axis region thereof, and an object-side surface and the image-side surface of the sixth lens element are aspheric;
    wherein the optical image capturing lens assembly has a total of six lens elements with refractive power, a focal length of the optical image capturing lens assembly is f, a curvature radius of the object-side surface of the fourth lens element is R7, a curvature radius of the object-side surface of the second lens element is R3, a curvature radius of the image-side surface of the second lens element is R4, and the following relationships are satisfied:

$0.60 < f/R7$; and $(R3+R4)/(R3-R4) \leq -1.09$.

2. The optical image capturing lens assembly of claim 1, wherein the sixth lens element has negative refractive power.

3. The optical image capturing lens assembly of claim 2, wherein the curvature radius of the object-side surface of the second lens element is R3, the curvature radius of the image-side surface of the second lens element is R4, and the following relationship is satisfied:

$-5.0 < (R3+R4)/(R3-R4) \leq -1.09$.

4. The optical image capturing lens assembly of claim 3, further comprising:
    a stop located between an imaged object and the second lens element, and both of the object-side surface and the image-side surface of the first through the sixth lens elements are aspheric.

5. The optical image capturing lens assembly of claim 3, wherein a focal length of the fifth lens element is f5, a focal length of the sixth lens element is f6, and the following relationship is satisfied:

$-1.0 < f6/f5 < -0.5$.

6. The optical image capturing lens assembly of claim 3, wherein the fifth lens element has an object-side surface being concave in a paraxial region thereof.

7. The optical image capturing lens assembly of claim 3, wherein an axial distance between the third lens element and the fourth lens element is T34, an axial distance between the fourth lens element and the fifth lens element is T45, and the following relationship is satisfied:

0.05<T34/T45<0.35.

8. The optical image capturing lens assembly of claim 3, wherein a distance in parallel with an optical axis from an axial vertex on the image-side surface of the fifth lens element to a maximum effective diameter position on the image-side surface of the fifth lens element is Sag52, a central thickness of the fifth lens element is CT5, and the following relationship is satisfied:

1.0<|Sag52|/CT5.

9. The optical image capturing lens assembly of claim 1, wherein the third lens element has an object-side surface being convex in a paraxial region thereof.

10. The optical image capturing lens assembly of claim 1, wherein a focal length of the third lens element is f3, a focal length of the fourth lens element is f4, and the following relationship is satisfied:

−0.6<f4/f3<0.3.

11. The optical image capturing lens assembly of claim 9, wherein the focal length of the optical image capturing lens assembly is f, the curvature radius of the object-side surface of the fourth lens element is R7, and the following relationship is satisfied:

0.6<f/R7<2.0.

12. The optical image capturing lens assembly of claim 9, wherein the third lens element has an image-side surface being concave in a paraxial region thereof, and the image-side surface of the third lens element changes to a convex shape from the paraxial region thereof to an off-axis region thereof.

13. The optical image capturing lens assembly of claim 12, wherein a central thickness of the fifth lens element is CT5, a central thickness of the sixth lens element is CT6, and the following relationship is satisfied:

0.5<CT5/CT6<1.2.

14. The optical image capturing lens assembly of claim 12, wherein the fourth lens element has an image-side surface being concave in a paraxial region thereof.

15. The optical image capturing lens assembly of claim 1, wherein an Abbe number of the first lens element is V1, an Abbe number of the second lens element is V2, an Abbe number of the third lens element is V3, and the following relationship is satisfied:

0.6<(V2+V3)/V1<1.2.

16. The optical image capturing lens assembly of claim 15, wherein a maximum image height of the optical image capturing lens assembly is ImgH, an axial distance between the object-side surface of the first lens element and an image plane is TL, and the following relationship is satisfied:

TL/ImgH<2.0.

17. The optical image capturing lens assembly of claim 1, wherein the third lens element has an image-side surface being concave in a paraxial region thereof, and the image-side surface of the third lens element changes to a convex shape and then to a concave shape from the paraxial region thereof to an off-axis region thereof.

18. The optical image capturing lens assembly of claim 1, wherein at least two lens elements among the first through the fourth lens elements have at least one inflection point formed on at least one of the object-side surface and the image-side surface thereof.

19. An image capturing device, comprising:
the optical image capturing lens assembly of claim 1; and
an image sensor located on an image plane side of the optical image capturing lens assembly.

20. An optical image capturing lens assembly comprising, in order from an object side to an image side:
a first lens element with positive refractive power having an object-side surface being convex in a paraxial region thereof and an image-side surface being concave in a paraxial region thereof;
a second lens element with negative refractive power having an object-side surface being concave in a paraxial region thereof and an image-side surface being convex in a paraxial region thereof;
a third lens element having refractive power;
a fourth lens element with refractive power having an object-side surface being convex in a paraxial region thereof;
a fifth lens element with positive refractive power having an image-side surface being convex in a paraxial region thereof; and
a sixth lens element with refractive power having an image-side surface being concave in a paraxial region thereof, wherein the image-side surface of the sixth lens element has at least one convex shape in an off-axis region thereof, and an object-side surface and the image-side surface of the sixth lens element are aspheric;
wherein the optical image capturing lens assembly has a total of six lens elements with refractive power, a focal length of the optical image capturing lens assembly is f, a curvature radius of the object-side surface of the fourth lens element is R7, a curvature radius of the object-side surface of the second lens element is R3, a curvature radius of the image-side surface of the second lens element is R4, and the following relationships are satisfied:

0.60<f/R7; and (R3+R4)/(R3−R4)<−1.0.

21. The optical image capturing lens assembly of claim 20, wherein the sixth lens element has negative refractive power.

22. The optical image capturing lens assembly of claim 21, wherein the curvature radius of the object-side surface of the second lens element is R3, the curvature radius of the image-side surface of the second lens element is R4, and the following relationship is satisfied:

−5.0<(R3+R4)/(R3−R4)<−1.0.

23. The optical image capturing lens assembly of claim 22, further comprising:
a stop located between an imaged object and the second lens element, and both of the object-side surface and the image-side surface of the first through the sixth lens elements are aspheric.

24. The optical image capturing lens assembly of claim 22, wherein a focal length of the fifth lens element is f5, a focal length of the sixth lens element is f6, and the following relationship is satisfied:

−1.0<f6/f5<−0.5.

25. The optical image capturing lens assembly of claim 22, wherein the fifth lens element has an object-side surface being concave in a paraxial region thereof.

26. The optical image capturing lens assembly of claim 22, wherein an axial distance between the third lens element and the fourth lens element is T34, an axial distance between the fourth lens element and the fifth lens element is T45, and the following relationship is satisfied:

$$0.05 < T34/T45 < 0.35.$$

27. The optical image capturing lens assembly of claim 22, wherein a distance in parallel with an optical axis from an axial vertex on the image-side surface of the fifth lens element to a maximum effective diameter position on the image-side surface of the fifth lens element is Sag52, a central thickness of the fifth lens element is CT5, and the following relationship is satisfied:

$$1.0 < |Sag52|/CT5.$$

28. The optical image capturing lens assembly of claim 20, wherein the third lens element has an object-side surface being convex in a paraxial region thereof.

29. The optical image capturing lens assembly of claim 20, wherein a focal length of the third lens element is f3, a focal length of the fourth lens element is f4, and the following relationship is satisfied:

$$-0.6 < f4/f3 < 0.3.$$

30. The optical image capturing lens assembly of claim 28, wherein the focal length of the optical image capturing lens assembly is f, the curvature radius of the object-side surface of the fourth lens element is R7, and the following relationship is satisfied:

$$0.6 < f/R7 < 2.0.$$

31. The optical image capturing lens assembly of claim 28, wherein the third lens element has an image-side surface being concave in a paraxial region thereof, and the image-side surface of the third lens element changes to a convex shape from the paraxial region thereof to an off-axis region thereof.

32. The optical image capturing lens assembly of claim 31, wherein a central thickness of the fifth lens element is CT5, a central thickness of the sixth lens element is CT6, and the following relationship is satisfied:

$$0.5 < CT5/CT6 < 1.2.$$

33. The optical image capturing lens assembly of claim 31, wherein the fourth lens element has an image-side surface being concave in a paraxial region thereof.

34. The optical image capturing lens assembly of claim 20, wherein an Abbe number of the first lens element is V1, an Abbe number of the second lens element is V2, an Abbe number of the third lens element is V3, and the following relationship is satisfied:

$$0.6 < (V2+V3)/V1 < 1.2.$$

35. The optical image capturing lens assembly of claim 34, wherein a maximum image height of the optical image capturing lens assembly is ImgH, an axial distance between the object-side surface of the first lens element and an image plane is TL, and the following relationship is satisfied:

$$TL/ImgH < 2.0.$$

36. The optical image capturing lens assembly of claim 20, wherein the third lens element has an image-side surface being concave in a paraxial region thereof, and the image-side surface of the third lens element changes to a convex shape and then to a concave shape from the paraxial region thereof to an off-axis region thereof.

37. The optical image capturing lens assembly of claim 20, wherein at least two lens elements among the first through the fourth lens elements have at least one inflection point formed on at least one of the object-side surface and the image-side surface thereof.

38. An image capturing device, comprising:
the optical image capturing lens assembly of claim 20; and
an image sensor located on an image plane side of the optical image capturing lens assembly.

* * * * *